(12) United States Patent
Shaked et al.

(10) Patent No.: US 12,229,952 B2
(45) Date of Patent: Feb. 18, 2025

(54) SYSTEM AND METHOD FOR RECONSTRUCTING MORPHOLOGY AND DYNAMICS OF BIOLOGICAL CELLS FROM HOLOGRAPHIC IMAGES

(71) Applicant: Ramot at Tel-Aviv University Ltd., Tel Aviv (IL)

(72) Inventors: Natan Tzvi Shaked, Mazkeret Batya (IL); Gili Dardikman, Tel Aviv (IL)

(73) Assignee: Ramot at Tel-Aviv University Ltd., Tel Aviv (IL)

( * ) Notice: Subject to any disclaimer, the term of this patent is extended or adjusted under 35 U.S.C. 154(b) by 494 days.

(21) Appl. No.: 17/614,179

(22) PCT Filed: May 27, 2020

(86) PCT No.: PCT/IL2020/050583
§ 371 (c)(1),
(2) Date: Nov. 24, 2021

(87) PCT Pub. No.: WO2020/240555
PCT Pub. Date: Dec. 3, 2020

(65) Prior Publication Data
US 2022/0230306 A1    Jul. 21, 2022

Related U.S. Application Data

(60) Provisional application No. 62/853,877, filed on May 29, 2019.

(51) Int. Cl.
*G06T 17/20* (2006.01)
*G06T 7/00* (2017.01)
(Continued)

(52) U.S. Cl.
CPC .............. *G06T 7/0012* (2013.01); *G06T 7/75* (2017.01); *G06T 17/20* (2013.01); *G06T 19/20* (2013.01);
(Continued)

(58) Field of Classification Search
CPC ......... G06T 7/0012; G06T 7/75; G06T 17/20; G06T 19/20; G06T 2207/10056;
(Continued)

(56) References Cited

U.S. PATENT DOCUMENTS 7,194,124 B2 *  3/2007  Soll ........................... G06T 7/20
                                                                  382/257
9,477,875 B2 * 10/2016  Ohya .................... G06T 7/0016
(Continued)

FOREIGN PATENT DOCUMENTS

WO    WO2016178234 A1    11/2016
WO    WO2018213723 A1    11/2018
WO    WO2019008569 A1     1/2019

OTHER PUBLICATIONS

P. Memmolo, G. Di Caprio, C. Distante, M. Paturzo, R. Puglisi, D. Balduzzi, A. Galli, G. Coppola, P. Ferraro, Identification of bovine sperm head for morphometry analysis in quantitative phase-contrast holographic microscopy. Opt. Express 19, 23215-23226 (2011).
(Continued)

*Primary Examiner* — Chan S Park
*Assistant Examiner* — D J Dhooge
(74) *Attorney, Agent, or Firm* — Whitestone Law, PLLC

(57) ABSTRACT

A reconstruction system is presented for reconstructing morphology of biological cells. The system includes data input and output utilities, memory, and a data processor, and is configured for data communication with an image data provider to receive raw image data comprising a sequence of image frames acquired from the cell during a movement of
(Continued)

the cell and being indicative of optical path delay (OPD) of light propagation through the biological cell. The data processor is configured and operable to process the raw image data and determine 3D dynamic morphological data of the cell. The data processor includes: a modeling utility; a position recovery module; and an analyzer module.

31 Claims, 11 Drawing Sheets

(51) Int. Cl.
G06T 7/73 (2017.01)
G06T 19/20 (2011.01)
G06V 20/64 (2022.01)
G06V 20/69 (2022.01)

(52) U.S. Cl.
CPC .......... *G06V 20/647* (2022.01); *G06V 20/693* (2022.01); *G06V 20/695* (2022.01); *G06T 2207/10056* (2013.01); *G06T 2207/20056* (2013.01); *G06T 2207/30024* (2013.01); *G06T 2219/2004* (2013.01)

(58) Field of Classification Search
CPC . G06T 2207/20056; G06T 2207/30024; G06T 2219/2004; G06V 20/647; G06V 20/693; G06V 20/695; G06V 20/64; G01P 13/04
See application file for complete search history.

(56) References Cited

U.S. PATENT DOCUMENTS 9,588,037 B2 * 3/2017 Ozcan ................... G03H 1/0465
10,061,003 B2 * 8/2018 James ...................... A61B 5/055

OTHER PUBLICATIONS

M. Haifler, P. Girshovitz, G. Band, G. Dardikman, I. Madjar, N. T. Shaked, Interferometric phase microscopy for label-free morphological evaluation of sperm cells. Fertil. Steril. 104, 43-47.e2 (2015).
S. K. Mirsky, I. Barnea, M. Levi, H. Greenspan, N. T. Shaked, Automated analysis of individual sperm cells using stain-free interferometric phase microscopy and machine learning. Cytom. A 91, 893-900 (2017).
G. Corkidi, B. Taboada, C. D. Wood, A. Guerrero, A. Darszon, Tracking sperm in three-dimensions. Biochem. Biophys. Res. Commun. 373, 125-129 (2008).
T. W. Su, L. Xue, A. Ozcan, High-throughput lensfree 3D tracking of human sperms reveals rare statistics of helical trajectories. Proc. Natl. Acad. Sci. U.S.A. 109, 16018-16022 (2012).
P. Memmolo, L. Miccio, F. Merola, P. A. Netti, G. Coppola, P. Ferraro, Investigation on 3D morphological changes of in vitro cells through digital holographic microscopy, in Optical Methods for Inspection, Characterization, and Imaging of Biomaterials, P. Ferraro, M. Ritsch-Marte, S. Grilli, D. Stifter, Eds. (SPIE, 2013), pp. 87920R.
G. Di Caprio, A. El Mallahi, P. Ferraro, R. Dale, G. Coppola, B. Dale, G. Coppola, F. Dubois, 4D tracking of clinical seminal samples for quantitative characterization of motility parameters. Biomed. Opt. Express 5, 690-700 (2014).
J. F. Jikeli, L. Alvarez, B. M. Friedrich, L. G. Wilson, R. Pascal, R. Colin, M. Pichlo, A. Rennhack, C. Brenker, U. B. Kaupp, Sperm navigation along helical paths in 3D chemoattractant landscapes. Nat. Commun. 6, 7985 (2015).
F. Silva-Villalobos, J. A. Pimentel, A. Darszon, G. Corkidi, Imaging of the 3D dynamics of flagellar beating in human sperm. Conf. Proc. IEEE Eng. Med. Biol. Soc. 2014, 190-193 (2014).
A. Bukatin, I. Kukhtevich, N. Stoop, J. Dunkel, V. Kantsler, Bimodal rheotactic behavior reflects flagellar beat asymmetry in human sperm cells. Proc. Natl. Acad. Sci. U.S.A. 112, 15904-15909 (2015).
M. U. Daloglu, W. Luo, F. Shabbir, F. Lin, K. Kim, I. Lee, J.-Q. Jiang, W.-J. Cai, V. Ramesh, M.-Y. Yu, A. Ozcan, Label-free 3D computational imaging of spermatozoon locomotion, head spin and flagellum beating over a large volume. Light Sci. Appl. 7, 17121 (2018).
H. Mikami, J. Harmon, H. Kobayashi, S. Hamad, Y. Wang, O. Iwata, K. Suzuki, T. Ito, Y. Aisaka, N. Kutsuna, K. Nagasawa, H. Watarai, Y. Ozeki, K. Goda, Ultrafast confocal fluorescence microscopy beyond the fluorescence lifetime limit. Optica 5, 117-126 (2018).
F. Merola, L. Miccio, P. Memmolo, G. Di Caprio, A. Galli, R. Puglisi, D. Balduzzi, G. Coppola, P. Netti, P. Ferraro, Digital holography as a method for 3D imaging and estimating the biovolume of motile cells. Lab Chip 13, 4512-4516 (2013).
F. Merola, P. Memmolo, L. Miccio, R. Savoia, M. Mugnano, A. Fontana, G. D'Ippolito, A. Sardo, A. Iolascon, A. Gambale, P. Ferraro, Tomographic flow cytometry by digital holography. Light Sci. Appl. 6, e16241 (2017).
N. T. Shaked, Quantitative phase microscopy of biological samples using a portable interferometer. Opt. Lett. 37, 2016-2019 (2012).
P. Girshovitz, N. T. Shaked, Compact and portable low-coherence interferometer with off-axis geometry for quantitative phase microscopy and nanoscopy. Opt. Express 21, 5701-5714 (2013).
P. Girshovitz, N. T. Shaked, Real-time quantitative phase reconstruction in off-axis digital holography using multiplexing. Opt. Lett. 39, 2262-2265 (2014).
J. W. Goodman, Introduction to Fourier Optics (Roberts & Company, ed. 3, 2005).
Y. Zhang, H. Wang, Y. Wu, M. Tamamitsu, A. Ozcan, Edge sparsity criterion for robust holographic autofocusing. Opt. Lett. 42, 3824-3827 (2017).
P. Müller, M. Schurmann, G. Jochen, The theory of diffraction tomography. arXiv:1507.00466 (2015).
Dardikman-Yoffe G. et al. "High-Resolution 4-D Acquisition of Freely Swimming Human Sperm Cells without Staining." Science Advances, American Association for the Advancement of Science, Apr. 1, 2020 Apr. 1, 2020 (Apr. 1, 2020).
Di Caprio G. et al., Holographic imaging of unlabelled sperm cells for semen analysis: a review. J. Biophotonics 8, No. 10, 779-789 (2015) / DOI 10.1002/jbio.201400093 Dec. 31, 2015.
International Search Report for PCT Patent App. No. PCT/IL2020/050583 (Aug. 23, 2020).
Mustafa Ugur Daloglu et al: "Label-free 3D computational imaging of spermatozoon locomotion, head spin and flagellum beating over a large volume", Light: Science & Applications, vol. 7, No. 1, Aug. 16, 2017 (Aug. 16, 2017), pp. 17121-17121.
Liu Lina et al: "Topography and refractometry of sperm cells using spatial light interference microscopy", Journal of Biomedical Optics, SPIE, 1000 20th St. Bellingham WA 98225-6705 USA, vol. 23, No. 2, Feb. 1, 2018 (Feb. 1, 2018), p. 25003.

\* cited by examiner

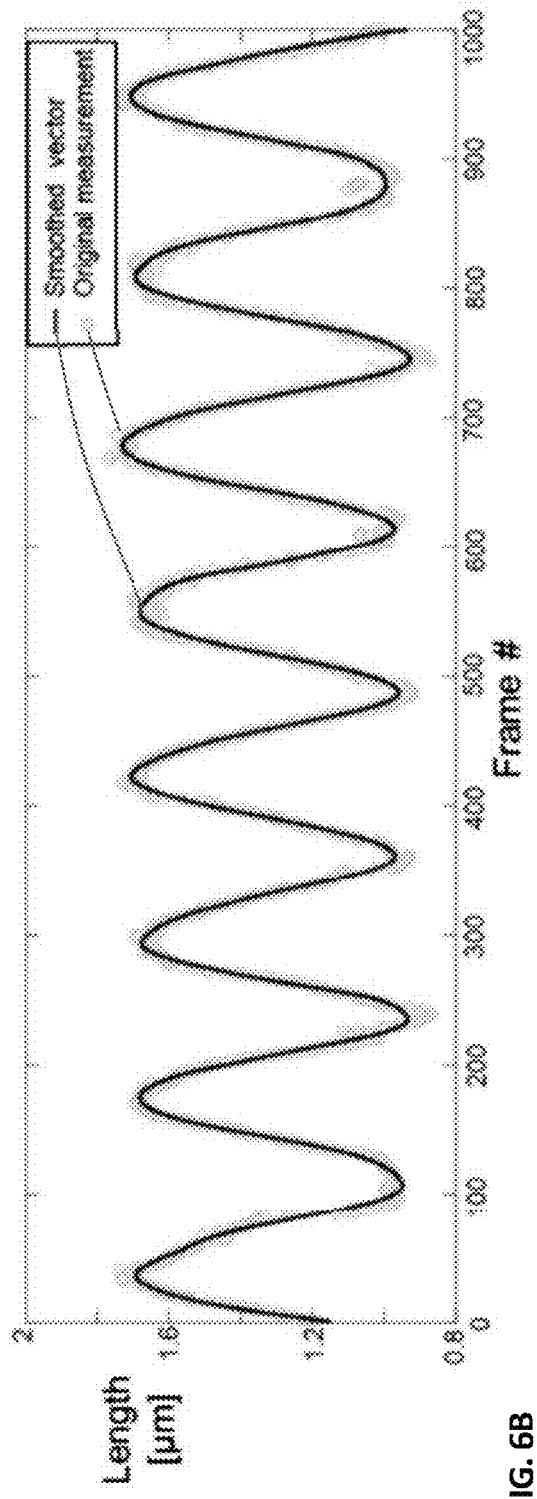
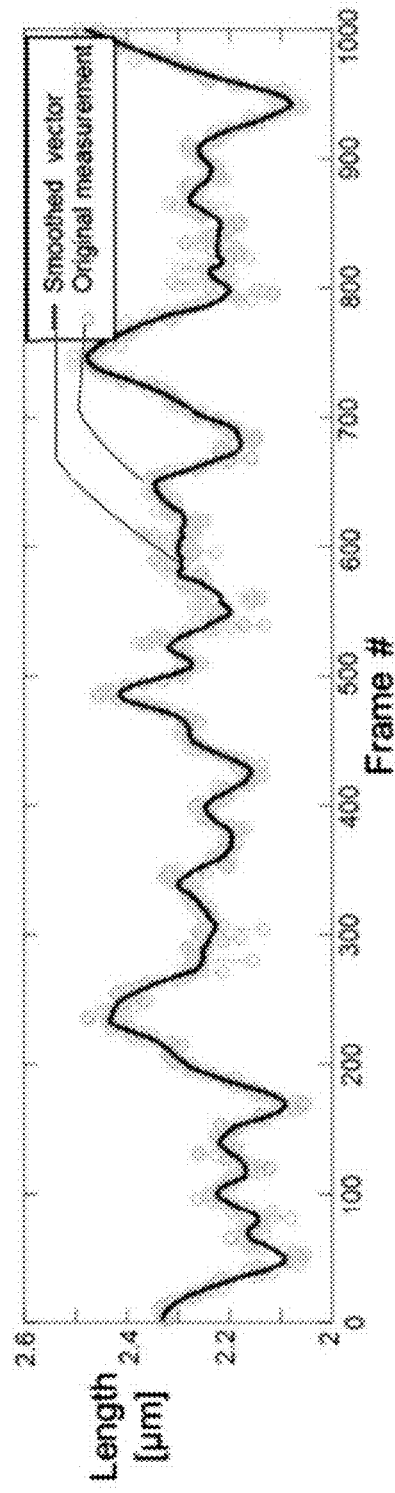
FIG. 6A
FIG. 6B

FIG. 9E
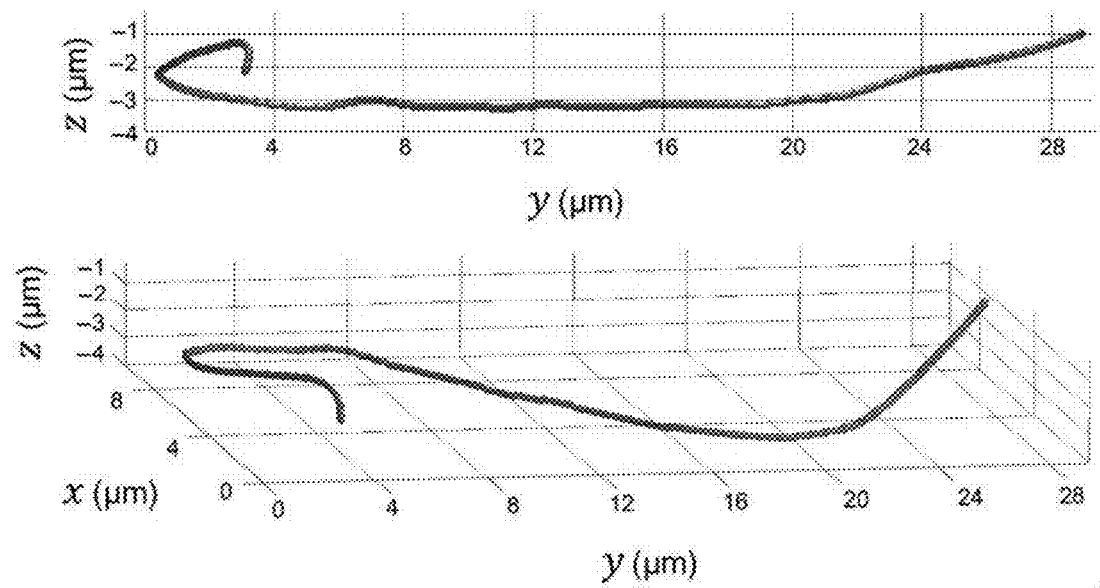
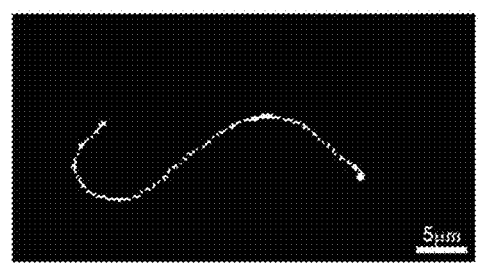
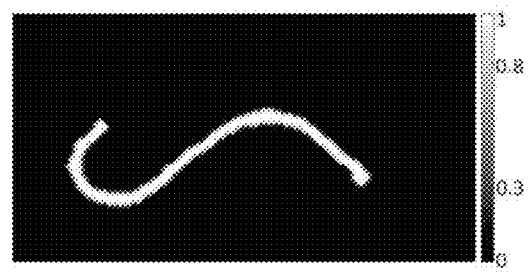
FIG. 10A
FIG. 10B

SYSTEM AND METHOD FOR RECONSTRUCTING MORPHOLOGY AND DYNAMICS OF BIOLOGICAL CELLS FROM HOLOGRAPHIC IMAGES

CROSS REFERENCE TO RELATED APPLICATION(S)

This application is a national phase filing under 35 C.F.R. § 371 of and claims priority to PCT Patent Application No. PCT/IL2020/050583, filed on May 27, 2020, which claims the priority benefit under 35 U.S.C. § 119 of U.S. Provisional Application No. 62/853,877 filed on May 29, 2019, the contents of each of which are hereby incorporated by reference in their entireties.

BACKGROUND

Some embodiments of the presently disclosed subject matter are generally in the field of quantitative phase imaging, and relate to a method and system of reconstruction of unstained biological cells, in particular sperm cells, using acquisition of quantitative phase imaging frames.

Related art references considered to be relevant as background to some embodiments of the presently disclosed subject matter are listed below:
1. P. Memmolo, G. Di Caprio, C. Distante, M. Paturzo, R. Puglisi, D. Balduzzi, A. Galli, G. Coppola, P. Ferraro, Identification of bovine sperm head for morphometry analysis in quantitative phase-contrast holographic microscopy. *Opt. Express* 19, 23215-23226 (2011).
2. M. Haifler, P. Girshovitz, G. Band, G. Dardikman, I. Madjar, N. T. Shaked, Interferometric phase microscopy for label-free morphological evaluation of sperm cells. *Fertil. Steril.* 104, 43-47.e2 (2015).
3. S. K. Mirsky, I. Barnea, M. Levi, H. Greenspan, N. T. Shaked, Automated analysis of individual sperm cells using stain-free interferometric phase microscopy and machine learning. *Cytom.* A 91, 893-900 (2017).
4. G. Corkidi, B. Taboada, C. D. Wood, A. Guerrero, A. Darszon, Tracking sperm in three-dimensions. *Biochem. Biophys. Res. Commun.* 373, 125-129 (2008).
5. T. W. Su, L. Xue, A. Ozcan, High-throughput lensfree 3D tracking of human sperms reveals rare statistics of helical trajectories. *Proc. Natl. Acad. Sci. U.S.A.* 109, 16018-16022 (2012).
6. P. Memmolo, L. Miccio, F. Merola, P. A. Netti, G. Coppola, P. Ferraro, Investigation on 3D morphological changes of in vitro cells through digital holographic microscopy, in *Optical Methods for Inspection, Characterization, and Imaging of Biomaterials*, P. Ferraro, M. Ritsch-Marte, S. Grilli, D. Stifter, Eds. (SPIE, 2013), pp. 87920R.
7. G. Di Caprio, A. El Mallahi, P. Ferraro, R. Dale, G. Coppola, B. Dale, G. Coppola, F. Dubois, 4D tracking of clinical seminal samples for quantitative characterization of motility parameters. *Biomed. Opt. Express* 5, 690-700 (2014).
8. J. F. Jikeli, L. Alvarez, B. M. Friedrich, L. G. Wilson, R. Pascal, R. Colin, M. Pichlo, A. Rennhack, C. Brenker, U. B. Kaupp, Sperm navigation along helical paths in 3D chemoattractant landscapes. *Nat. Commun.* 6, 7985 (2015).
9. F. Silva-Villalobos, J. A. Pimentel, A. Darszon, G. Corkidi, Imaging of the 3D dynamics of flagellar beating in human sperm. *Conf Proc. IEEE Eng. Med. Biol. Soc.* 2014, 190-193 (2014).
10. A. Bukatin, I. Kukhtevich, N. Stoop, J. Dunkel, V. Kantsler, Bimodal rheotactic behavior reflects flagellar beat asymmetry in human sperm cells. *Proc. Natl. Acad. Sci. U.S.A.* 112, 15904-15909(2015).
11. M. U. Daloglu, W. Luo, F. Shabbir, F. Lin, K. Kim, I. Lee, J.-Q. Jiang, W.-J. Cai, V. Ramesh, M.-Y. Yu, A. Ozcan, Label-free 3D computational imaging of spermatozoon locomotion, head spin and flagellum beating over a large volume. *Light Sci. Appl.* 7, 17121 (2018).
12. H. Mikami, J. Harmon, H. Kobayashi, S. Hamad, Y. Wang, O. Iwata, K. Suzuki, T. Ito, Y. Aisaka, N. Kutsuna, K. Nagasawa, H. Watarai, Y. Ozeki, K. Goda, Ultrafast confocal fluorescence microscopy beyond the fluorescence lifetime limit. *Optica* 5, 117-126 (2018).
13. F. Merola, L. Miccio, P. Memmolo, G. Di Caprio, A. Galli, R. Puglisi, D. Balduzzi, G. Coppola, P. Netti, P. Ferraro, Digital holography as a method for 3D imaging and estimating the biovolume of motile cells. *Lab Chip* 13, 4512-4516 (2013).
14. F. Merola, P. Memmolo, L. Miccio, R. Savoia, M. Mugnano, A. Fontana, G. D'Ippolito, A. Sardo, A. Iolascon, A. Gambale, P. Ferraro, Tomographic flow cytometry by digital holography. *Light Sci. Appl.* 6, e16241 (2017).
15. N. T. Shaked, Quantitative phase microscopy of biological samples using a portable interferometer. *Opt. Lett.* 37, 2016-2019 (2012).
16. P. Girshovitz, N. T. Shaked, Compact and portable low-coherence interferometer with off-axis geometry for quantitative phase microscopy and nanoscopy. *Opt. Express* 21, 5701-5714 (2013).
17. P. Girshovitz, N. T. Shaked, Real-time quantitative phase reconstruction in off-axis digital holography using multiplexing. *Opt. Lett.* 39, 2262-2265 (2014).
18. J. W. Goodman, *Introduction to Fourier Optics* (Roberts & Company, ed. 3, 2005)
19. Y. Zhang, H. Wang, Y. Wu, M. Tamamitsu, A. Ozcan, Edge sparsity criterion for robust holographic autofocusing. *Opt. Lett.* 42, 3824-3827 (2017).
20. P. Müller, M. Schurmann, G. Jochen, The theory of diffraction tomography. arXiv:1507.00466 (2015).

Acknowledgement of the above references herein is not to be inferred as meaning that these are in any way relevant to the patentability of some embodiments of the presently disclosed subject matter.

BACKGROUND

Sperm cell selection has a critical role in producing a healthy offspring. In vitro fertilization (IVF) allows surpassing obstacles preventing couples from procreating naturally. Specifically, in intracytoplasmic sperm injection (ICSI), a single good sperm is selected for direct injection into the ovum. This process poses an innate difficulty, as the natural sperm selection method induced by the race to the ovum, perfected by millions of years of evolution, is replaced by an external selection performed by the clinician, where the cost of inadequate selection could be catastrophic. Indeed, when done in vitro rather than naturally, this process can require not only a skilled clinician, but also a great deal of technological assistance, as sperm cells are extremely small and fast, and have very low amplitude contrast, making it nearly impossible to make an educated choice based on standard bright-field microscopy (BFM).

Phase imaging methods record the delay in the passage of light through the sample, producing label-free contrast in the image. Unstained, real-time, high magnification motile sperm organelle morphology examination techniques have been developed based on differential interference contrast (DIC) imaging of the sperm head, able to increase pregnancy rates. However, the contrast yielded by this method is not quantitative, meaning the information acquired is 2D, and it also presents significant imaging artifacts near the cell edges, which may yield incorrect morphological assays. Alternative techniques have been developed, replacing DIC with interferometric phase microscopy [1] have been developed, utilizing a holographic imaging method which allows for a fully quantitative measurement of the cell optical thickness (i.e., the product of the refractive index and the physical thickness) for sperm examination. This, in fact, enabled pseudo-3D label-free examination of sperm cells for the first time, opening the door to more elaborate computer vision algorithms for sperm selection, based not only on the 2D morphology of the sperm cell head but also on 3D parameters such as its thickness, dry mass, and volume [2, 3].

Numerous methods have been suggested in the past decade to allow clinicians to view the full 3D motion patterns and morphologies of sperm cells, based on the understanding that the information hidden in the third dimension may hold the solution to better sperm selection; this is equivalent to the necessity of CT imaging over a single X-Ray shot when trying to locate an abdominal tumor. The first techniques were focused on 4D tracking methods based on pinpointing the 3D location of a single point on the sperm, usually the sperm head centroid, over time [1, 4-7]. However, some of these techniques suffer from a need to manually obtain the sperm trajectories w as the main focus was the high speed acquisition of 3D data [4], thus making it inappropriate for clinical use. The automated, high-throughput tracking technique [5] was based on holographic lens-free shadows of sperms that are simultaneously acquired at two different wavelengths, emanating from two sources placed at 45° with respect to each other, where the 3D location of each sperm is determined by the centroids of its head images reconstructed in the vertical and oblique channels. Another technique [6] suggested estimating the coordinate along the optical (z) axis from digital holographic microscopy (DHM) images by using the Tamura coefficient, an image contrast measure, to estimate of the in-focus distance. The use of DHM images was suggested, by reconstructing the optical wavefront at different distances from the plain of acquisition using the Fresnel diffraction theorem, and finding the ideal focus location by a refocusing criterion based on the invariance of both energy and amplitude, with an algorithm looking for the minimum of a function within a fixed interval [7]. Also, DHM images of sperm cells have been used together with the Rayleigh-Sommerfeld back-propagator to reconstruct the optical wavefront at different distances from the plain of acquisition, deriving the z-coordinate location of the sperm head centroid location from the steepest intensity gradient along z [8].

Various techniques have been developed to track the location of the entire flagellum in 3D space and time [9-11]. These include techniques utilizing an oscillating objective mounted on a bright field optical microscope [9] allowing to obtain the best or better flagellum focused sub-regions associated to their respective z positions; an algorithm that reconstructs the vertical beat component from 2D BFM images [10]; and the use of simultaneous illumination from two sources emerging from two oblique angles [5], providing a high-throughput and label-free holographic method that can simultaneously reconstruct both the full beating pattern of the flagellum, and the translation and spin of the head [11].

Label-based confocal fluorescence microscopy can obtain high spatial-resolution 3-D cell imaging [12]. However, it cannot be used in human sperm cell selection during ICSI as staining is not allowed. Furthermore, the use of label-based confocal fluorescence microscopy is very challenging to obtain the entire sperm head and flagellum 3-D reconstruction during rapid free swim because of the need to scan over time and the low amounts of fluorescence emission in each temporal frame.

The use of digital holography has been proposed [13] as a method for 3D imaging and estimating the biovolume of motile cells, where a simple Gaussian beam inducing self-rotation of the cell was used to acquire quantitative phase-contrast images from multiple view points, processed using the Shape From Silhouette (SFS) paradigm to estimate the external 3D shape of the sperm cell head.

GENERAL DESCRIPTION

As described above, the use of digital holography has been proposed [13] for 3D imaging and estimating the biovolume of motile cells. However, this method is incapable of capturing the internal organelles using a single frame acquisition of the OPD of the sperm head or its 4-D flagellum beating. In tomographic phase microscopy, a series of QPI acquisitions of the specimen taken from multiple angles are processed and positioned in the 3-D Fourier space so that the refractive index map can be reconstructed.

There is accordingly a need in the art for an effective solution for the problem of reconstructing the full 3D morphologies of unstained biological cells, such as sperm cells.

Some embodiments of the presently disclosed subject matter provides a novel approach for solving the above problem, by providing a system and method for reconstructing the full 3D morphology data of a cell from raw image data collected from freely (uninterrupted) swimming cells. The inventors have demonstrated a 4D acquisition method for the entire sperm cell (head with organelles and flagellum) during free swim and without staining. Moreover, the image data that can be processed and analyzed by the technique of some embodiments of the presently disclosed subject matter to provide such full 3D morphology data is "raw Optical Path Delay (OPD) data" in the meaning that it can be acquired by any suitable optical tomography or the like phase imaging equipment, but without a need for any physical mechanisms for rotation of the cell and/or the optical head of the imaging equipment and association of the image data piece (image frame) with a respective angular orientation of the cell.

More specifically, the image data suitable to be used for the purposes of some embodiments of the presently disclosed subject matter is holographic data, being raw holographic data in the meaning described above, and some embodiments are therefore described below with respect to this specific example. It should, however, be understood that the principles of some embodiments are not limited to this specific implementation of image data collection, provided that the image data includes a sequence of image frames (video) each being indicative of a full complex wavefront of light propagation through a sample being imaged during the frame. Such holographic data may be obtained using quantitative phase microscope QPM (interferometric or non-interferometric phase microscope).

As noted above, some embodiments provide a 4D acquisition method for the entire sperm (head with organelles and flagellum) during free swim and without staining. It should be noted that even though sperm flagellum defects have been postulated to be prognostic for fertilization failure, the low visibility of the flagellum resulted in that it has been disregarded in most known sperm selection protocols.

Some embodiments provide effective technique for full reconstruction of the morphological data of the sperm cells from a simple holographic video, including both 3D full structure and dynamics, while treating the head and the flagellum of the sperm cell as separate entities due to their physical dissimilarity, and applying different approaches for each of them.

It should be understood that the technique of some embodiments is partly aimed at improvement of sperm cell selection in IVF, and is therefore described below with respect to this specific application. However, the principles of some embodiments are not limited to reconstruction of sperm cell morphology, and may generally be used for examining any a biological cell of the type having a physical structure of at least a portion thereof that causes it to rotate during a substantially periodic swimming pattern of the natural swimming of the cell in the fluid channel.

Some embodiments of the presently disclosed subject matter takes advantage of the fact that there are biological cells whose physical/geometrical structure cause the cell (or one or more portions/compartments of the cell) to rotate while freely disposed in a fluid channel. Sperm cells present an example of such type of cells. Another potential application is imaging cells in a flow channel, wherein, such cells may spontaneously or otherwise present rotational movement, which would facilitate acquisition of their QPI maps in varying viewing angles. In this context, it should be noted that the term "freely swimming" refers to a natural cell swim in a fluid channel or free swim induced by/resulted from some initial stimulation.

As described above, today, clinicians base the process of sperm selection on morphology and dynamics assessment based on 2D imaging methods. Nevertheless, both the structure and the natural movement of the human sperm cell are 3D, thus an entire aspect of the dynamics and morphology of sperm cells is currently disregarded due to a technological barrier.

Sperm cell has head, midpiece and principle tail portions. The inventors have found that such fact that these portions (and in particular the head and the principle tail or flagellum portions) due to their essentially different shapes/geometries continuously rotate about 3 axes during the freely swimming of the sperm cell, can be used for 3D morphology reconstruction of the above-described raw image data. Such raw image data, at times referred to herein as "raw holographic data" or "holographic video", enabling 3D morphology reconstruction of the cell according to some embodiments, is the data indicative of sequentially acquired full complex wavefronts of light propagating through the cell during imaging and carrying information about optical path delay (OPD) caused by light propagation through the cell.

According to some embodiments of the presently disclosed subject matter, a reconstruction system for reconstructing morphology of biological cells is provided, the system including data input and output utilities, memory, and a data processor, and being configured for data communication with an image data provider to receive from the image data provider raw image data including a sequence of OPD image frames acquired from the cell during a movement of the cell and being indicative of optical path delay (OPD) of light propagation through the biological cell, wherein the data processor is configured and operable to process the raw image data and determine 3D dynamic morphological data of the cell, the data processor including:

a modeling utility configured and operable to provide a plurality of models descriptive for a number of selected portions of the biological cell;

a position recovery module configured and operable to perform, for each selected portion of the biological cell, model-based processing of the raw image data and determine segments of appearance of the selected portion of the biological cell in the image frames of at least a part of the sequence and determine a position data of the selected portion of the cell in the image frames; and an analyzer module configured and operable to analyze the segments of image frames and the corresponding position data, and, for each of the selected portions of the biological cell, apply complex wavefront based processing to the segments of the image frames to generate reconstruction data indicative of a three-dimensional structure of the selected portion of the biological cell.

The model of the selected portion of the cell includes a 3D primitive structure descriptive for a shape of the portion of the cell of the type to be reconstructed from the sequence.

In some embodiments, the determined segments of appearance of the selected portion include a single segment at which the selected portion appears in each of the image frames, and the position data includes data indicative of three-dimensional orientation of the appearance of the selected portion in the segment of each image frame. The model of the selected portion may further include modelled motion pattern of the selected portion during the movement of the cell. Such modelled motion pattern is indicative of rotational movement corresponding to varying viewing angles.

The raw image data may be indicative of autonomous—whether free or constrained—swimming pattern of the biological cell, being a living cell, having a physical structure that causes the selected portion to rotate during movement while swimming, thereby enabling the appearance of different three-dimensional orientations of the cell during movement in the image frames.

Such living cell may be a sperm cell, and the selected portion of the sperm cell to be reconstructed includes at least a head portion of the sperm cell. The analyzer module may thus be configured and operable to generate the reconstruction data including 3D refractive index profile of the head portion retrieved from a plurality of the image frames.

The selected portions of the sperm cell to be reconstructed may further include a flagellum portion. To this end, the segments of appearance of the flagellum portion include a plurality of segments in each of the image frames associated with sub-portions of the flagellum portion. The model data of the flagellum portion includes the 3D primitive structure having a shape having axial symmetry about a roll axis. The position recovery module is configured and operable to apply the model-based processing to the flagellum portion by fitting a chain of the axially symmetric shape to the sub-portions of the flagellum portion, to determine the position data indicative of three-dimensional position and two-dimensional orientation of each sub-portion of the flagellum portion, thereby determining a three-dimensional shape of the flagellum portion in the image frame. The analyzer module is configured and operable to reconstruct dynamic data of the sperm cell based on four-dimensional motion pattern of the flagellum portion retrieved from a change in three-dimensional shape of the flagellum portion in a plurality of the image frames. More specifically, the analyzer module is configured and operable to analyze the image frames and generate reconstruction data including the 3D refractive index profile of the head portion and the dynamic data of the sperm cell based on the 4D motion pattern of the flagellum portion.

In some embodiments, the 3D primitive structure descriptive for the selected portion of the cell is a structure having basic asymmetry with respect to three axes, e.g. cell has a non-spherically symmetric primitive shape with respect to three axes. For example, the 3D primitive structure of the selected portion, being a head portion of a sperm cell, has a characteristic relation between three different spatial dimensions [A,B,C] of the 3D primitive structure defining the basic asymmetry thereof, thereby enabling the determination of the three-dimensional orientation in each of the image frames. The 3D primitive structure descriptive for the head portion of the cell may be an ellipsoid, the different spatial dimensions [A,B,C] being major and minor radii of the ellipsoid (B>>A>C).

The position recovery module may thus to utilize the different spatial dimensions of the modeled structure, to retrieve, from each image frame, all three angles of the head portion with respect to a reference 3D coordinate system. The three angles of the head portion orientation for each image frame may be determined from a best fit condition between an image projection of the head portion in the image frame and a rotated position of the descriptive 3D primitive structure.

In some embodiments, the position recovery module is configured and operable to apply a 2D fitting procedure to each image frame in the sequence of the image frames, and determine, per each image frame, parameters of a 2D fit between a 2D projection of the 3D primitive structure to appearance of the selected portion of the cell in the image frame, thereby determining 2D fitted projections. The parameters of the 2D fit between the 2D projection of the 3D primitive structure to appearance of the selected portion of the cell in the image frame may include: 2D centroid [x,y] parameters of the fit of the 2D projection of the 3D primitive structure on the X-Y plane of the light field image frame, Gross-Yaw orientation α and, 2D sizes of a bounding box of the fitted 2D projection.

The 2D fitting procedure may include determining, for each respective image frame, a focal plane [z] corresponding to a best fit between the 2D projection of the 3D primitive structure and the appearance of the portion of the cell in the image frame. The focal plane z is a third centroid parameter of the 2D fit, thereby yielding 3D centroid [x,y,z] parameters of the fit of the 2D projection on the X-Y plane of the image frame.

The Gross-Yaw orientation α may be determined within a range of [0,180] in each of the image frames. The data processor may be configured and operable to provide a morphological model of at least one selected portion of a cell of the type similar to the biological cell appearing in the sequence of image frames (video). The morphological model may characterize an organelle (e.g., midpiece, acrosome, nucleus, vacuoles) located from one side of the selected portion of the cell.

The position recovery module may be configured and operable to process the OPD data of the image frame to identify a side of the organelle location relative to the at least portion of the cell and apply parity [+/−] correction to the Gross-Yaw orientation α of the light field image frame. By this, the Gross-Yaw orientation α is expanded to the full [−180,+180] range.

In some embodiments, the position recovery module is configured and operable to apply a 3D fitting procedure to the image frame and determine, per each image frame, parameters of a 3D fit between the 3D primitive structure and appearance of the selected portion of the cell in the image frame. For example, the 3D fitting procedure includes use of the fitted 2D projections in the image frames and the characteristic relation between three different spatial dimensions [A,B,C] of the 3D primitive structure to determine the parameters of the 3D fit including: 3D orientations [roll Θ, pitch χ, precise-yaw α+α$_0$] of fitted 3D primitive structure in each of the image frames. The position recovery module may be configured and operable to determine the at least one of the roll Θ and pitch χ within a range of [0,180] in each image frame, and utilizing a motion pattern model of the cell characterizing at least an expected continuous rotational movement of the cell during the sequence of image frames about an axis non perpendicular to an image plane to apply a parity [+/−] correction to the roll Θ and/or pitch χ orientations of each successive image frame of the sequence according the roll Θ and/or pitch χ of the preceding image frame based on the continuous rotational movement, thereby expanding the roll Θ and/or the pitch χ parameters to the full [−180,+180] range.

In some embodiments, the analyzer module is configured and operable to generate the reconstruction data including the 3D profile of the refractive index of the head portion by performing, for each image frame, a three-dimensional Fourier transform of a wavefront corresponding to the single segment of the image frame at the determined 3D orientation.

In some embodiments, the analyzer module is further configured and operable to analyze the reconstruction data of the head portion of the sperm cell to identify a region of a relatively high refractive index within a proximal part of the head portion where it interfaces with a midpiece part of the flagellum portion of the cell, and generate image data of a sperm centriole area.

In some embodiments, the position recovery model is configured and operable to determine a z-axis location associated with a narrowest appearance of each sub-portion of the flagellum portion. For example, the position recovery model is configured and operable to iteratively track the sub-portions of the flagellum portion from its proximal to distal end, and perform the model-based fitting of the chain of cylinders to the sub-portions of the flagellum portion and determine pixelized representation of the sub-portions of the flagellum portion in each image frame.

The position recovery module may be configured and operable to perform the model-based processing separately with respect a midpiece part and a non-midpiece part of the flagellum portion using first and second modeled cylinder structures, respectively. The pixelized representation thus includes first and second groups of pixels corresponding to, respectively, the first and second parts of the flagellum portion of the cell.

The analyzer module may be configured and operable to analyze the pixelized representation and determine a global average, over all the image frames, of a maximal phase value and a width of the sub-portion for each of the first and second groups. Here, the width of the sub-portion is determined as a thickness of a central pixel of the sub-portion.

According to some other embodiments of the presently disclosed subject matter, a reconstruction system for reconstructing morphology of a human sperm cell is provided. The system includes data input and output utilities, memory, and a data processor, and is configured for data communication with an image data provider to receive from the image data provider raw image data including a sequence of image frames acquired from the sperm during a movement of the sperm cell and being indicative of optical path delay (OPD) of light propagation through the sperm cell. The data processor is configured and operable to process the raw image data and determine 3D dynamic morphological data of the sperm cell. The data processor includes:

a modeling utility configured and operable to provide at least one first model descriptive for a head portions of the sperm cell and at least one second model descriptive for a flagellum portions of the sperm cell;

a position recovery module configured and operable to perform, for each of the head and flagellum portions of the sperm cell, model-based processing of the raw image data and determine segments of appearance of the respective portion in the image frames of at least a part of the sequence and determine first and second position data of the head and flagellum portions, respectively, in the image frames, the first position data including data indicative of three-dimensional orientation of the appearance of the head portion in the respective segment of each image frame, and the second position data being indicative of three-dimensional position and two-dimensional orientation of sub-portion of the flagellum portion in the image frames; and an analyzer module configured and operable to analyze the segments of image frames and the first and second position data, and apply complex wavefront based processing to the segments of the image frames to generate reconstruction data including 3D refractive index profile of the head portion and dynamic data of the sperm cell based on 4D motion pattern of the flagellum portion.

BRIEF DESCRIPTION OF THE DRAWINGS

In order to better understand the subject matter that is disclosed herein and to exemplify how it may be carried out in practice, embodiments will now be described, by way of non-limiting examples only, with reference to the accompanying drawings, in which:

FIGS. 3A-3C schematically illustrate the principles of the sperm cell head orientation recovery process from the sequence of OPD image frames according to some embodiments of the presently disclosed subject matter, where the camera plane (image plane) is parallel to the x-y plane, wherein FIG. 3A shows a 3D ellipsoid model and illustrates the pitch, roll, and yaw angular orientations, and the characteristic spatial dimensions of the ellipsoid A, B, and C (defining the model constants), and FIGS. 3B and 3C show 2D projections of the head portion of the sperm cell while, respectively, lying flat and lying on its side;

FIGS. 5A-5B illustrate experimental results for the technique of some embodiments of the presently disclosed subject matter for processing a sequence of OPD image frames of a sperm swimming freely in a perfusion chamber, wherein FIG. 5A shows middle slices along the three main axes, FIG. 5B shows thresholded 3D rendering from various perspectives showing three main components of the sperm head: cell membrane, acrosomal vesicle, and nucleus part;

FIGS. 6A and 6B exemplify the major and minor radius vectors, respectively, obtained for a head portion of a sperm cell before and after smoothing, demonstrating the repetitive nature of sperm head rotation during free swim;

FIGS. 7A-7B illustrate the principles of the technique of some embodiments of the presently disclosed subject matter for finding the sperm head roll direction, wherein FIG. 7A shows the clockwise rotation direction and FIG. 7B shows the counterclockwise rotation direction;

FIGS. 9A-9E illustrates the principles of segmentation procedure used in the technique of some embodiments of the presently disclosed subject matter in determination of the flagellum position data, wherein FIG. 9A shows digital focusing procedure, FIG. 9B shows a 2D segmentation map of the flagellum, FIGS. 9C and 9D show complete 3D segmentation map, and FIG. 9E shows 3D segmentation result from two viewpoints;

FIGS. 10A and 10B exemplify two location maps suitable for use for recursive function in the segmentation step of determination of the flagellum position data in some embodiments of some embodiments of the presently disclosed subject matter, wherein FIG. 10A shows the original binary location map restored from an image frame, and FIG. 10B shows the weighting map being a weighted, dilated version of the original binary map used for preventing deviation from the flagellum in the successive image frame; and FIGS. 11A-11D exemplify experimental results of full 4D reconstruction of a sperm cell, wherein FIG. 11A shows overlay of four consequent frames from the 3D motion of the sperm cell, FIG. 11B shows overlay of 15 frames from the 3D motion, FIG. 11C shows a single frame from the 3D motion pattern revealing the internal structure of the sperm cell, and FIG. 11D shows different views of the 3D trajectory of the sperm cell head centroid, as time progresses.

DETAILED DESCRIPTION OF EMBODIMENTS

Figure 1:
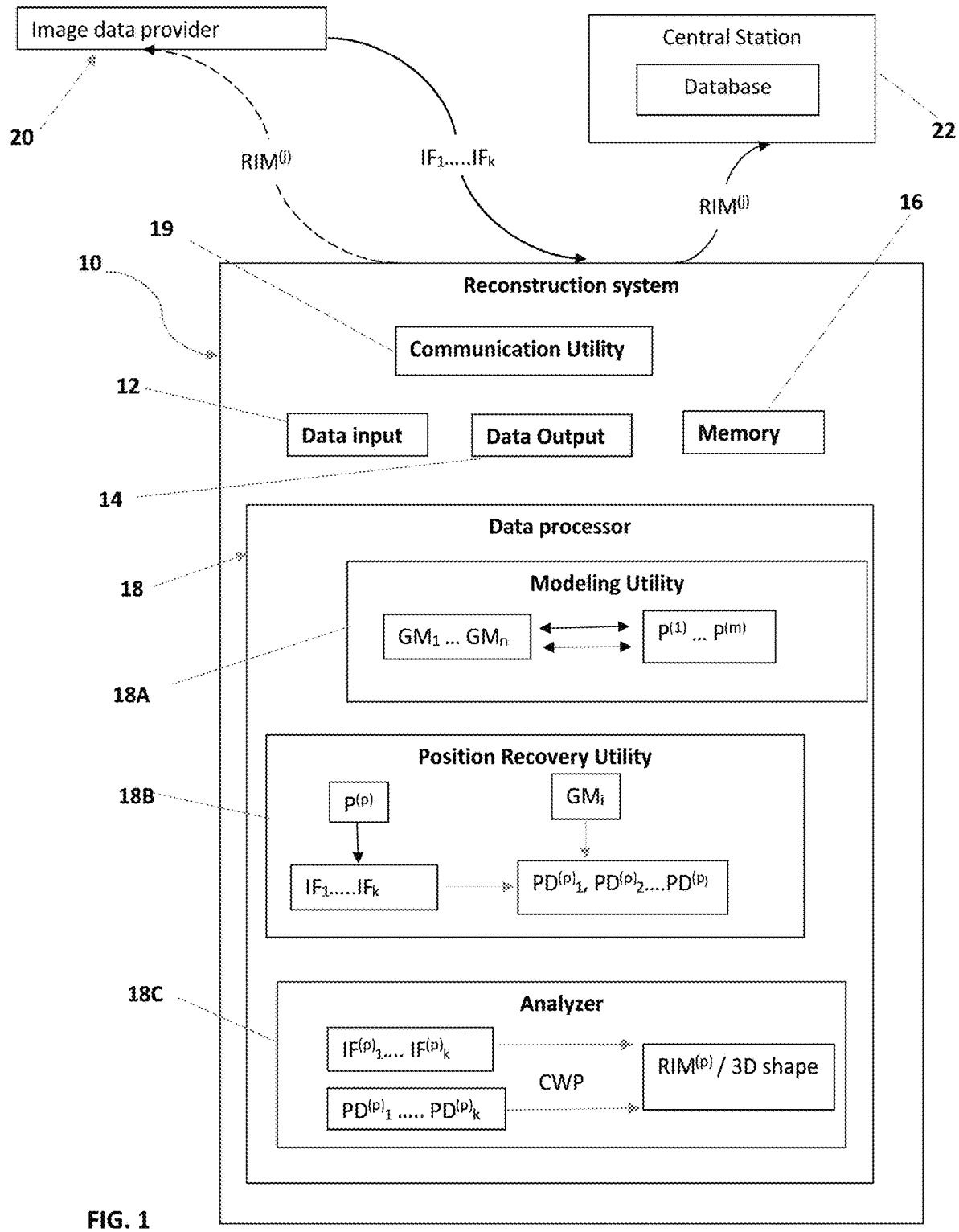
FIG. 1 is a block diagram of a reconstruction system of some embodiments of the presently disclosed subject matter.

Reference is made to FIG. 1 illustrating, by way of a block diagram, a control system 10 of some embodiments of the presently disclosed subject matter configured and operable for full 4D reconstruction of the morphology and dynamics of a biological cell of the type having at least a portion thereof rotatable during a natural swimming. As noted above, some embodiments of the presently disclosed subject matter is particularly useful for inspecting and reconstructing sperm cells and is therefore described below with respect to this specific application, although the principles of some embodiments of the presently disclosed subject matter are not milted to its use for inspection of sperm cells.

The control system 10 is a computerized system having such main functional utilities as data input and output utilities 12 and 14, memory 16, and a data processor 18. The control system 10 is configured and operable for receiving input data indicative of measurements performed on a biological cell using any suitable quantitative phase imaging (QPI) technique during a free movement of the biological cell, e.g. free swimming in a fluid channel. The QPI-based image typically includes a plurality of pixels, each pixel being characterized at least by an intensity and an corresponding phase delay. Generally, such image data is indicative of a complex wavefront describing an optical path delay (OPD) of light propagating through a sample being imaged. For simplicity, and without limiting the principles of some embodiments of the presently disclosed subject matter to any specific known imaging technique suitable to provide the OPD image data, the sequence of such OPD data pieces is referred to hereinbelow as image frames.

It should be noted that according to some embodiments of the presently disclosed subject matter, the OPD-based data or a sequence of OPD image frames present raw image data in the meaning that this data does not include or is not accompanied with associated information about angular orientations between the cell and an imaging scheme used while imaging. Thus, the input image data to be used for the depth resolved refractive image profile reconstruction according to some embodiments of the presently disclosed subject matter is a sequence of K raw image frames $IF_1 \ldots IF_k$ corresponding to the OPD data pieces obtained during a movement of the cell (e.g. natural swimming in a fluid channel). The system 10 is configured and operable to receive and process this image data to generate a reconstruction depth resolved data indicative of a three-dimensional profile/map of refractive index RIM of the cell or at least a portion thereof. This reconstruction data is indicative of morphological data of the respective cell (cell portion) which is stored and may then be used for classifying the cell and decision making about the cell (e.g. a decision about individually selecting or dismissing the unstained sperm cell for use in the assisted reproduction procedure).

The control system 10 is configured for data communication with an image data provider 20, which may be constituted by an imaging system (its internal memory) which performs holographic imaging sessions and generates the holographic video, or by a separate storage system which receives such data from imaging system(s) and stores the data for further use. Generally, the control system 10 may be an integral part of the imaging system, or, as shown in a non-limiting example of FIG. 1, may be a stand-alone system in data communication with the image data provider 20. Accordingly, the control system 10 may include appropriate communication device 19 capable of communication with remote systems using any known suitable communication technique and protocols.

As indicated above, the imaging system suitable to provide input sequence of OPD image frames (e.g. derived from a holographic video) for the purposes of some embodiments of the presently disclosed subject matter may be of any known suitable configuration capable of acquiring a sequence of holographic images of a sperm cell naturally swimming in a fluid channel and providing data indicative of the entire complex wavefront of light (carrying intensity and phase information) that propagated through a sample being imaged. Such imaging system may include a quantitative phase microscope QPM (interferometric phase microscope or tomographic phase microscope).

Figure 2:
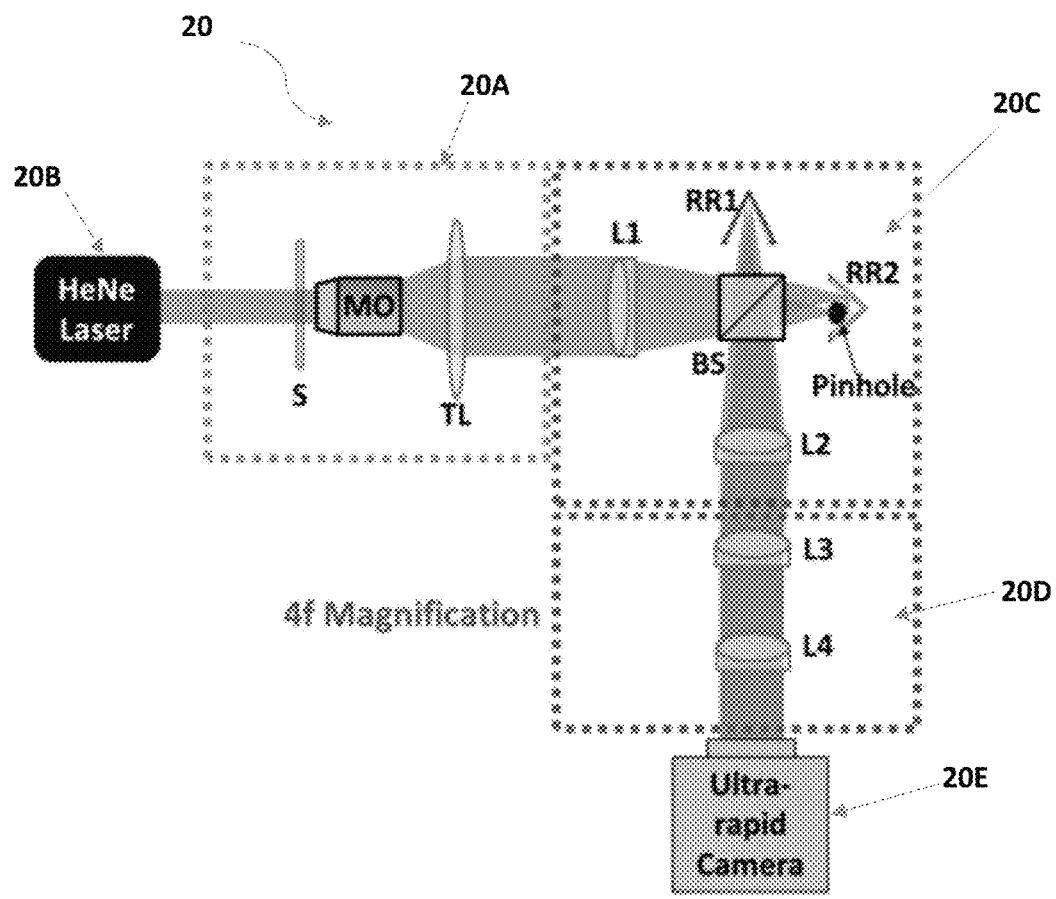
FIG. 2 is a schematic illustration of an exemplary imaging system suitable to provide the raw image data of a biological cell to be processed by the reconstruction system of FIG. 1.

FIG. 2 schematically illustrates, in a self-explanatory manner, an exemplary imaging system 20 suitable to provide such holographic video of a cell. In this non-limiting example, the imaging system 20 includes an inverted microscope part 20A associated with a light source unit 20B (e.g. laser unit), an OPD generation assembly of a type of an interferometric module 20C, and an optical magnification assembly 20D, and is configured and operable to provide quantitative phase maps of the freely swimming sample SC (sperm cell). The system 20 includes a microscope objective MO, an achromatic tube lens TL, beam splitter BS, retroreflector mirrors RR1 and RR2, lenses L1, L2, L3 and L4, and an ultra rapid imager sensor (camera). Light from a relatively spatially-coherent light source 20B (e.g. helium-neon laser source) illuminates the sample SC in the inverted microscope 20A, and a resulting sample beam then enters the off-axis external interferometric module 20C, where it is split by beam splitter BS into two beams of equal intensities. The first beam is focused by achromatic lens L1 onto the laterally shifted retroreflector mirror RR1, causing a small shift in the illumination angle on a detector (camera) 20E, producing off-axis interference. The second beam exiting the beam splitter BS is focused by lens L1 onto a pinhole placed in the Fourier plane of the lens L1, thereby removing all the high spatial frequencies containing the sample information and thus creating a clean reference beam. The reference beam is then reflected back to the beam splitter BS by retroreflector mirror RR2. The two beams then merge in the beam splitter BS and, after passing through another achromatic lens L2 and an additional magnifying 4f system (composed of achromatic lenses L3 and L4), an off-axis image hologram is created on an ultrafast digital camera. The OPD data can be easily obtained from the holographic video, e.g. as a topographic map data. The principles of configuration and operation of such quantitative phase microscope are known and do not form part of some embodiments of the presently disclosed subject matter, and therefore need not specifically described, except to note the following:

An interferometric system is able to record the entire wavefront that propagated through a sample (rather than just its intensity), by interfering it with a constant (reference) wavefront, yielding a digital hologram (interferogram). The resultant hologram is given by the following expression:

$$|E_s(x, y) + E_r|^2 = |E_s(x, y)|^2 + |E_r|^2 +$$
$$A_s(x, y)A_r \exp[j\varphi_s(x, y) - j\varphi_r] + A_s(x, y)A_r \exp[j\varphi_r - j\varphi_s(x, y)]$$

and $E_s(x,y)$ and $E_r$ are the sample and reference complex wavefronts, respectively (the latter assumed to be of constant phase and amplitude) determined as:

$$E_s(x, y) = A_s(x, y)\exp[j\varphi_s(x, y)] \text{ and } Er = Ar\exp[j\varphi r].$$

Thus, the wavefront that propagated through the sample is fully conserved, although its extraction remains difficult. Such OPD image frame is, by itself, a 3D information map, as per each x-y pair, there is an OPD value, which is representative of the z of this x-y pair.

It should be noted that some embodiments of the presently disclosed subject matter is not limited to any specific type and configuration of imaging system which provides a sequence of OPD-based image frames. Also, as noted above, the reconstruction system of some embodiments of the presently disclosed subject matter may receive such sequence either from the imaging system (its memory utility) or from a separate storage device.

As described above, the reconstruction of the complex wavefront of holographic image frames typically can require Fourier transformation of each image frame, which in turn can require to locate/position a projection of the sample in the 3D Fourier space using knowledge about the angle at which the projection of the sample has been captured. Existing tomographic approaches are based on either illumination rotation or controlled sample rotation, allowing a priori knowledge on the angles of the acquired interferometric projections. Alternatively, random rotation of cells while flowing along a microfluidic channel or perfusion chamber can be used for tomography for a degenerate case, assuming rotation around a single axis [14].

In the case of a human sperm cell swimming freely, though, the swimming pattern is too complex to apply any of the existing tomographic image processing techniques, which must or should take into account the rotation around all three major axes: pitch, roll, and yaw. To this end, some embodiments of the presently disclosed subject matter, according to some of its aspects, utilizes modeling geometry/shape of a selected portion of the cell. i.e. modeling of the head of the sperm cell and using model data to process the raw OPD image frames of freely swimming cell.

Turning back to FIG. 1, the data processor 18 includes a modeling utility 18A, a position recovery utility 18B, and an analyzer utility 18C. The modeling utility 18A is configured and operable to provide a number N (N≥1) of models $GM_1 \ldots GM_n$ including data about a geometrical model descriptive for a number M (M≥1) of selected portions $P_1 \ldots P_m$ of the cell, and in some cases also modeled motion data/pattern associated with the respective geometrical structure.

In this regard, it should be noted that the modeling utility 18A may be configured and operable to create such models for each specific cell as well as each specific portion of the cell whose morphology is to be reconstructed, or may provide previously created model(s), for example by receiving such data from a central system/storage, as the case may be. The model used in the 3D position recovery technique of some embodiments of the presently disclosed subject matter is based on a 3D primitive structure descriptive for a shape of a selected portion of a cell of the type to be reconstructed and a motion-relating model (modelled motion pattern) for such selected portion of the cell. This will be described more specifically further below.

The position recovery module 18B is configured and operable to apply model-based processing to each h-th image frame from at least a part of the K raw image frames, $IF_1 \ldots IF_k$, using at least one predetermined i-th model, $GM_i$, with respect to each p-th selected portion, $P^{(p)}$, of the cell. Such model-based processing, which will be described more specifically further below, enables to determine, for each h-th image frame and each selected p-th portion of the cell, a 3D position data of the appearance of the selected portion $P^{(p)}$ in a segment of the image frame. To this end, the position recovery model 18B operates to perform segmentation procedure for the image frames to generate a segmented map, which is based on a fitting process, starting from 2D fitting.

It should be noted that the segmentation and position data determination for the head and flagellum and midpiece portion are essentially different, More specifically, for the head portion the position data includes 3D orientation data, while for the flagellum and midpiece there is no need to determine at least the roll orientation. This will be described further below. Thus, the description below with regard to the fitting procedure relates to the head portion. It should also be noted that the head portion is treated as a spatially rigid body in between frames, while the flagellum with midpiece portion is treated (modeled) as a chain of a plurality of sub-portion having axial symmetry about the roll axis. The head portion has no axial symmetry and therefore its roll orientation needs and can be determined, for the purpose of 3D refractive index reconstruction. Finally, after determining the full 3D position data including orientation of the head portion and the position and partial 3D orientation (e.g. excluding the roll axis orientation) of the flagellum with midpiece sub-portions, all the portions of the cell can be chained together to provide the 3D shape and position of the entire cell for each image frame.

It should be understood that, generally, the image frame can cover more than one cells. However, for simplicity let's consider that each h-th image frame contains a single cell in question or at least a portion of the cell.

Thus, all the K image frames undergo model-based processing to determine respective 3D position data pieces $PD^{(p)}_1 \ldots PD^{(p)}_k$ forming a 3D position pattern for the selected portion $P^{(p)}$ of the cell.

It should be noted that although in this specific example the same number K of the image frames in the sequence is processed by the position recovery module, some embodiments of the presently disclosed subject matter are not limited to this specific example, and, as mentioned above, only part of the image frames of the input sequence may be processed for this purpose.

As noted above, in some embodiments of the presently disclosed subject matter, the position data pieces are indicative of three-dimensional orientations of the selected portion of the cell in the identified segments in the image frame. As mentioned above, some embodiments of the presently disclosed subject matter is aimed at reconstruction of 3D morphology and dynamics of a living cell during movement of the cell, and possibly during natural swimming of the cell in a fluid channel, where the living cell is of the type having a physical structure of at least one portion of the cell that causes this at least one portion to rotate during movement. This enables appearance of different three-dimensional orientations of the cell, or the at least portion thereof, during movement in the image frames. Some embodiments of the presently disclosed subject matter is particularly useful for reconstruction of 3D morphology and dynamics of a sperm cell, whose head portion rotates during the cell's swim.

Hence, the position pattern/map $PD^{(p)}_1 \ldots PD^{(p)}_k$ determined by the position recovery module/utility is indicative of three-dimensional orientations of the head portion $p^{(head)}$ of the sperm cell in the K image frames of the sequence. To this end, for a sperm cell, the morphology of the cell and, most specifically of its head portion, is determined based on the 3D position data of the head portion, while the dynamic data of the sperm cell is determined based on the 3D shape and position of the entire cell for plurality of the image frames.

The analyzer module 18C is configured and operable to analyze the image frames with the corresponding three-dimensional orientations or, generally, position data pieces for each of the selected portions of the cell, and apply complex wavefront based processing CWP to the image frames and generate reconstruction depth resolved data. Such reconstruction data is indicative of a three-dimensional profile of refractive index of the cell within the p-th selected portion of the cell, $RIM^{(p)}$.

As described above, according to some embodiments of the presently disclosed subject matter, OPD image frames are processed separately with regard to the head and flagellum portions of a sperm cell, applying different approaches to these portions as separate entities due to their physical dissimilarity to determine 3D position data for the flagellum portion (via 4D segmentation) and 3D orientation of the head portion for each image frame. Then, the complete reconstruction of the refractive index profile combines 4D segmentation results for the flagellum with 3D refractive index reconstruction of the head portion and the 3D orientation of the head portion retrieved for each frame. This will be described more specifically further below.

As described above, in the case of a human sperm cell swimming freely the reconstruction technique should take into account the rotation around all three major axes: pitch, roll, and yaw. As also described above, the model relating to a selected portion of the cell includes a 3D primitive structure descriptive for a shape of the portion of the cell of the type to be reconstructed from the sequence of OPD-based image frames and a modeled motion pattern for such structure.

Considering the head portion of a sperm cell, the 3D primitive structure is a structure having basic asymmetry, e.g. having a non-spherically symmetric primitive shape. Such 3D primitive structure descriptive for the head portion has a characteristic relation between three different spatial dimensions [A,B,C] of the 3D primitive structure defining the basic asymmetry thereof and has a modeled motion pattern, thereby enabling to determine three-dimensional orientations of the head portion (i.e. segments of its appearance in the image frame) in each of the image frames. As will be described further below, the flagellum with midpiece portion of a sperm cell, whose position data is determined separately, can be modeled using a cylinder as a 3D primitive structure having axial symmetry and describing the flagellum and midpiece portion as a chain of cylindrical sections.

Considering the head portion of a sperm cell, the 3D primitive structure may be an ellipsoid structure. The different spatial dimensions [A,B,C] defining the basic asymmetry of the ellipsoid include major radius B and minor radii A and C satisfying a condition that B>>A>C.

The data processor 18 (its position recovery utility 18B) is capable of using such ellipsoid-based model data $GM_{head}$ (including the modeled 3D primitive and the modeled motion pattern thereof) to retrieve all three angles around three major axes (pitch, roll, and yaw) from each OPD image frame based on the major and minor radii extracted from the segmented phase map of the head portion (whose creation will be described more specifically further below), requiring a single acquisition per frame. In this regard, reference is made to FIGS. 3A-3C schematically illustrating the sperm cell head orientation recovery process from the sequence of OPD image frames, where the camera plane (image plane) is parallel to the x-y plane.

Figure 3A:
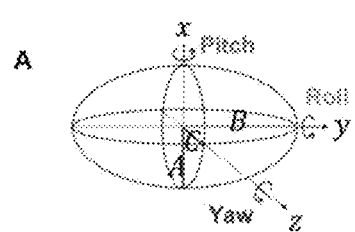
Figure 3B:
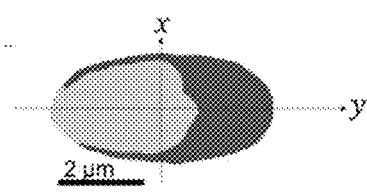
Figure 3C:
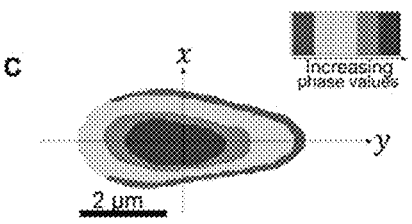

Here, FIG. 3A shows a 3D ellipsoid model and illustrates the pitch, roll, and yaw angular orientations, and the characteristic spatial dimensions of the ellipsoid A, B, and C (defining the model constants). FIGS. 3B and 3C show 2D projections of the head portion of the sperm cell while, respectively, lying flat and lying on its side.

The three model constants (A, B, C) can be extracted from the major and minor radii vectors, retrieved from a plurality (e.g. from a few tens to a few thousands) of consecutive image frames, while relying on the periodicity of the sperm's head rolling. By virtue of the periodic swimming pattern, the 3D position pattern $PD^{(p)}_1 \ldots PD^{(p)}_k$ obtained as described above and as will be more detailed below, is indicative of full (spiral) angular coverage for the holographic video of K image frames (sequence of OPD image frames).

As will be described more specifically further below, each specific frame orientation is determined via interpolation, because of the basic asymmetry of the sperm cell, inducing A≠B≠C. This enables to recover the orientation that yields the same projected ellipse as the rotated ellipsoid model, and using continuity constraints to find the cases in which there is more than one orientation that causes the same projected ellipse providing definitive recovery. In this regard, it should be noted, and will be described more specifically further below, that despite the fact that an idealized primitive ellipsoid has three planes of symmetry, the reconstruction of the head portion of the sperm cell utilizes rotation of the real 3D reconstructed model, which has no plane of symmetry, thus providing 360° rotation period.

Figure 4:
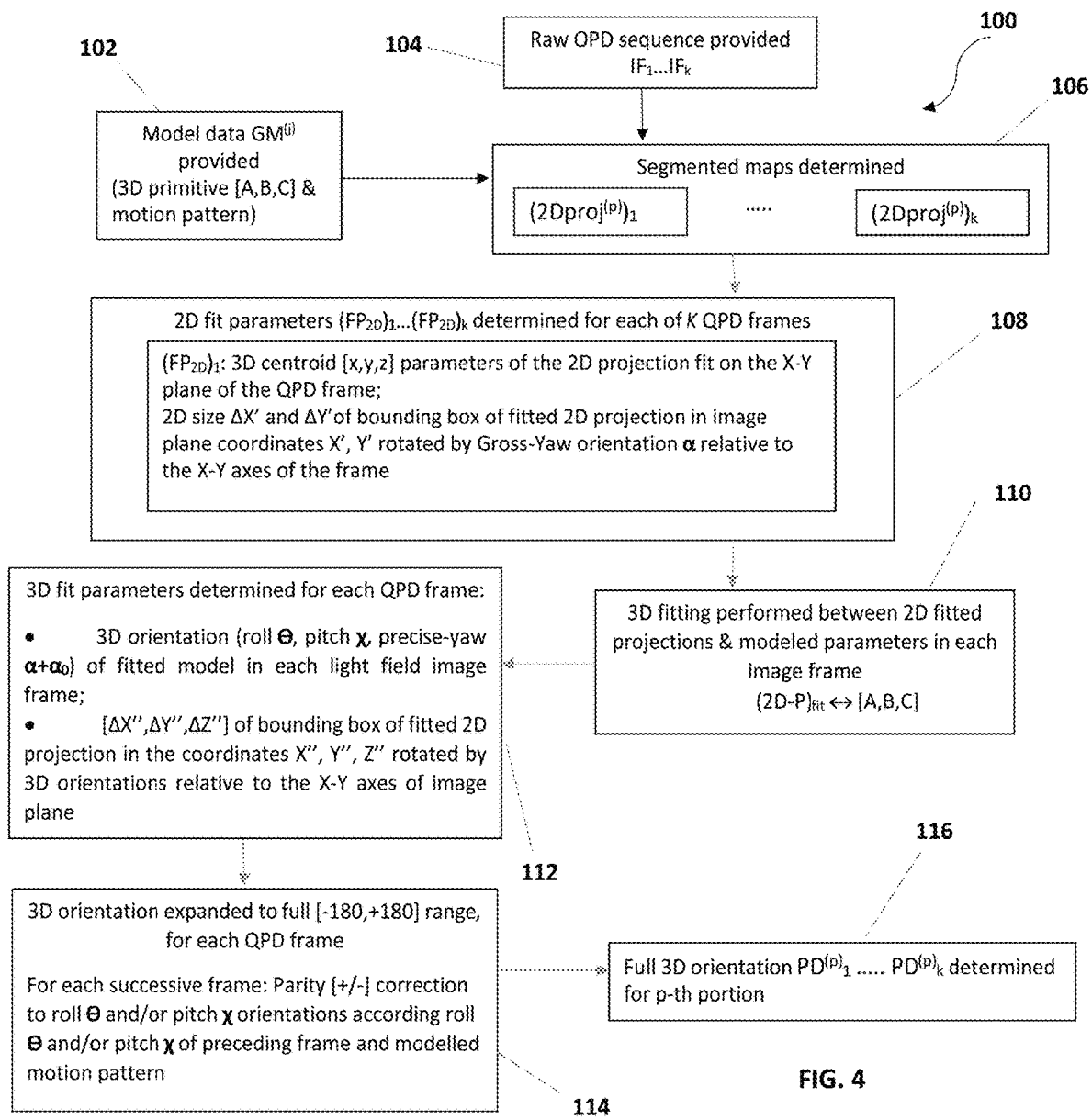
FIG. 4 exemplifies the operation of the position recovery module/utility of the reconstruction system of FIG. 1 to process the input OPD image frames with respect to a selected portion of the cell (head portion), and obtain the 3D orientation data for the portion.

Reference is made to FIG. 4 exemplifying, by way of flow diagram 100, the operation of the position recovery module/utility 18B to process the input OPD image frames $IF_1, \ldots, IF_k$ with respect to a p-th portion of the cell, and obtain the 3D orientation data for the portion.

The model data $GM^{(p)}$ for the cell portion (head) is provided including the 3D primitive structure with its characteristic spatial dimensions [A,B,C] as described above and a corresponding motion pattern—step 102. Also provided is the sequence of OPD image frames $IF_1, \ldots, IF_k$—step 104.

The image frames are analyzed using the modeled structure to determine the segmented map data—step 106. To this end, a 2D fitting is applied, for each image frame. The 2D fitting procedure yields the segmented portion of the image frame at which the cell appears corresponds to the size of a bounding box. The 2D fitting is used to determine parameters of a 2D fit between a 2D projection of the 3D primitive shape model and the segment of appearance of the respective portion (head portion) in the respective image frame, and identify the 2D fitted projection corresponding to the best fit condition for each frame—step 108.

More specifically, the parameters of the 2D fit for each segment in each image frame include: a 2D centroid parameters [x,y] of the fit of the 2D projection of the modeled structure on the X-Y plane of the image frame, Gross-Yaw orientation α, and 2D sizes ΔX' and ΔY' of a bounding box of the fitted 2D projection in the image plane coordinates X', Y' rotated by the Gross-Yaw orientation α relative to the X-Y axes of the plane of the image frame. The 2D fitting procedure includes also determination, for each segment in each image frame, a focal plane [z] at which the best fit between the 2D projection of the modeled structure and the appearance of portion of the cell is obtained. The focal plane z is a third centroid parameter of the 2D fit, thereby yielding 3D centroid [x,y,z] parameters of the fit of the 2D projection on the X-Y plane of the image frame.

It should be noted that the Gross-Yaw orientation α is determined within the range of [0,180] for each image frame. Using a morphological model for the head portion of a sperm cell (or generally using such model for a cell of the type similar to the cell appearing in the OPD image frames to be reconstructed), which model includes data characterizing an organelle [e.g. neck/acrosome] located from one side of selected portion of the cell, allows to identify a side of the organelle location relative to the selected portion of the cell, and accordingly to apply parity [+/−] correction to Gross-Yaw orientation α of the image frame. By this, the Gross-Yaw orientation α is expanded to the full [−180,+180] range.

The 2D fitted projections are then used to perform 3D fitting procedure on the image frames of the consecutive sequence—step 110. This allows to determine, for each image frame, parameters of the 3D fit between the 3D primitive shape model and the segmented map—step 112.

The 3D fitting procedure includes using the fitted 2D projections in the multiple image frames, respectively, and the relation between the different spatial size dimensions [A,B,C] of the 3D primitive shape model to determine the parameters of the 3D fit. These parameters include: 3D orientations [roll $\Theta$, pitch $\chi$, precise-yaw $\alpha+\alpha_0$] of the fitted 3D primitive shape model in the image frame. More specifically, the 3D fit parameters include 3D sizes [$\Delta X''$, $\Delta Y''$, $\Delta Z''$] of the bounding box (defined by a binary mask, as will be described more specifically further below) of the fitted 2D projection in the coordinates X", Y", Z" rotated by the 3D orientations relative to the X-Y axes of the image plane of the image frame. Here, the roll $\Theta$ and/or pitch $\chi$ angle(s) can be determined within the range of [0,180] in each image frame.

The continuous motion pattern is used, which characterizes/describes at least an expected continuous rotational movement of the cell (or cell's portion) during the acquisition of the sequence of the image frames about an axis non-perpendicular to the image plane, to apply parity [+/−] correction to the roll $\Theta$ and/or pitch $\chi$ orientations for each image frame according the roll $\Theta$ and/or pitch $\chi$ parameter(s) of the preceding image frame and the continuous rotational movement. By this, the roll $\Theta$ and/or pitch $\chi$ parameters are expanded to the full [−180,+180] range—step 14.

The 3D fit projections are then used to determine the 3D orientation data for the head portion of the cell for each image frame—step 116.

The analyzer module (18C in FIG. 1) then utilizes the 3D orientation pattern and performs any suitable complex wavefront based processing on the segmented maps of the head portion appearance in the image frames and reconstructs the 3D profile of the refractive index of the head portion of the cell. This can, for example, be implemented by positioning the Rytov field of each projection at the calculated orientation in the 3D Fourier space. This will be described more specifically further below.

Figure 5A:
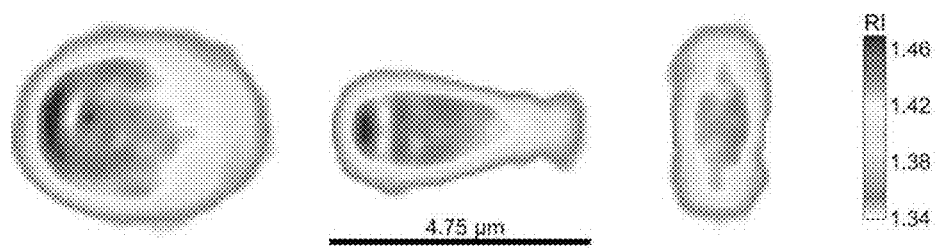
Figure 5B:
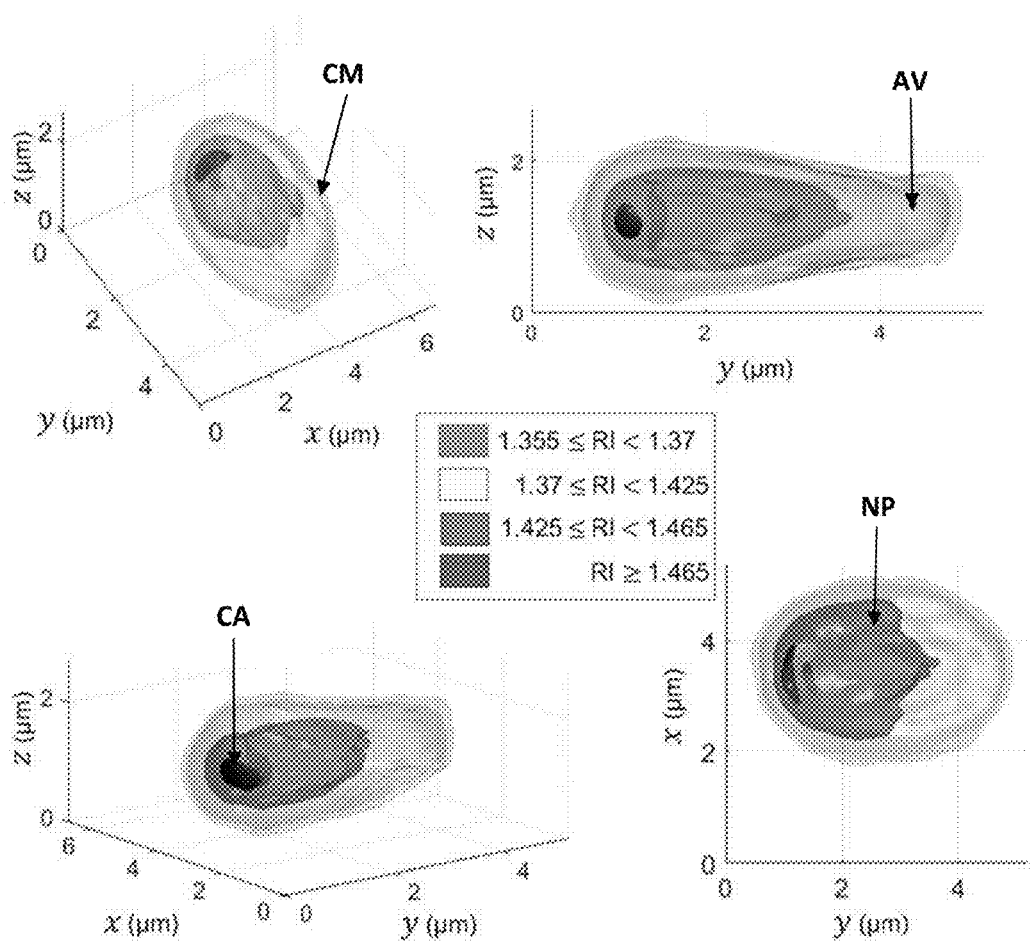

The result of the experiments conducted by the inventors of the use of the above technique of some embodiments of the presently disclosed subject matter for processing a sequence of OPD image frames corresponding to a holographic video of 1000 frames of a sperm swimming freely in a perfusion chamber is illustrated in FIGS. 5A-5B, showing middle slices along the three main axes (FIG. 5A), and thresholded 3D rendering from various perspectives (FIG. 5B). This result agrees with the previous studies of the internal structure of the sperm cell head, clearly showing the three main components of the sperm head: cell membrane CM, acrosomal vesicle AV, and nucleus part NP.

It should be noted that the sperm head reconstruction also reveals a region of higher refractive index in the proximal part of the head, closest to the midpiece. This can be attributed to the sperm centriole area CA, which organelle is crucial for the development of the embryo after fertilization.

The reconstruction of the refractive index map of the head portion of a sperm cell is based on the (imaging) assumption that the sperm cell head is a rigid body, due to a low confinement and flow rate [14], other than negligible deformation in the distal edge. Also, the internal structure of the sperm head remains constant throughout the recording process, and its orientation can be the only thing that changes. Further, it should be noted that sperm cells swimming toward the camera (i.e., perpendicular to the image plane) might cause difficulties in recovering the head orientation, as in these cases, the major radius may effectively turn into the minor radius of the projection and vice versa. However, this practically does not happen for sperm cells swimming in a perfusion chamber parallel to the camera.

As mentioned above, and will be described specifically further below, the technique of some embodiments of the presently disclosed subject matter provides for effective reconstruction of the flagellum portion of a sperm cell. In this regard, it should be noted that the difficulty in tracing the flagellum, which is as thin as the resolution-limited spot and thus might be easily masked by coherent noise, can be reduced using a low-coherence light source, thus increasing the sensitivity of the localization task. For the task of localization of the flagellum, it is effectively treated as a superposition of point-like scatterers, which may reduce accuracy for "singular" orientations of the flagellum relative to the camera, such as rod-like segments aligned along the optical axis.

The following is a specific example of the implementation of the general principles of the technique of some embodiments of the presently disclosed subject matter, as described above, for reconstruction of the head portion of a sperm cell.

First, a binary mask of the head portion area is determined for the purposes of creating the segmented map (i.e. 2D fitting). This process may need to retrieve focus of the sperm head. This process can start from the first frame, guessing the optimal focus location of the head to be at the middle of the range (i.e., the z=0 plane). It should be noted that in order to facilitate efficient segmentation process in the low signal-to-noise-ratio conditions, a good (x,y,z) starting point in each frame may be found, being a so-called "seed point". The "seed point" serves as the starting point for searching the 2D segment (or otherwise the boundaries of the binary mask) defining the appearance of the head portion of the sperm cell. For sperm head segmentation, ideally the seed point, by which segmentation/2D fit procedure starts, may be the neck area connecting the sperm head and midpiece. In order to efficiently segment the head portions in plurality of frames, assumption of the continuity of the sperm cell movement across the frames, and optionally also the motion pattern/model of the sperm cell movement, can be used to guess the location of the seed point in one frame based on the seed point found in a preceding or proceeding frames (utilizing the continuity of the sperm cell movement to identify seed point of a certain cell, may be important in case where a plurality of cells appear in at frames in order to allow to associate the correct frame segment of the certain cell, i.e. to differentiate it from among possible segments of other cells in the frame). Toward this end, all frames are first rotated according to the optical flow, such that the overall swimming direction of the cell is left to right. For instance, the procedure of finding the seed point in the plurality of frames may start. from the first frame, guessing the z coordinate of the seed point to be at the middle of the range (i.e., the z=0 plane).

Then, the modulus of the phase profile at this depth is reconstructed (because of phase-unwrapping problems that may occur in out-of-focus regions) and used to calculate the binary mask of the head portion area. This can be implemented by taking a low threshold (~0.25 radians), zeroing out most of the flagellum area, but not the slightly elevated phase values of the midpiece area, followed by morphological opening and closing.

The 2D fitting procedure may be performed as follows: The orientation of the ellipse that has the same normalized second central moments as the binary mask is calculated, indicating the estimated slope at the neck ($S_n$). Then, the binary mask undergoes dilation to include the area that will be occupied by the head in out-of-focus frames. The depth range for the search of optimal focus is determined by a fixed window parameter, which is larger in value for the first frame, as the initial depth estimation is a guess, such that continuity is not expected.

For each depth in the search area, a new binary mask of the sperm head and neck is calculated with a slightly higher threshold (~0.4 radians) so as to exclude most of the flagellum, but not the midpiece.

Then, the orientation of the ellipse, which has the same normalized second central moments as the binary mask, is calculated and used to rotate the head to a horizontal position. In this horizontal position, morphological opening with a vertical line-structuring element is applied, effectively erasing the midpiece area with minimal damage to the rest of the cell, such that the leftmost column indicates the seed point.

As will be described further below, the length of the midpiece can then be evaluated by taking the difference between the original and cleaned rotated binary maps and calculating the major axis length of the remaining object.

After flagging the seed point, the mask can be rotated back to its original position, thereby determining the actual row and column of the seed point. Then, a line centered in the x-y location of the seed point and orthogonal to the neck, the direction of which is determined by estimated slope S, is retrieved from the phase image cleaned by the TALCC function (i.e. targeted, adaptable, locally conserving cleaning (TALCC) function, created by the inventors, as will be described below). This line is used to determine the ultimate focus location of the x-y seed point by recovering numerous parameters.

First, the line is fitted with a Gaussian, from which the width, expected value, amplitude, and maximal value of the section are determined.

Second, the number of maxima points in the original line values is determined. Last, the sum of the absolute gradient of the line values in the amplitude image is calculated. Then, the smoothed width vector, amplitude vector, and sum of the absolute gradient vector, obtained for the entire depth range, are used to calculate a triple score vector, given by the element-wise multiplication of the sum of the absolute gradient and width vectors divided by the amplitude vector. The depth with the lowest score (thus with the steepest, most narrow Gaussian and with the most transparent amplitude image) corresponds to the ideal focus plane, yielding the depth of the seed point ($z_s$). To prevent poorly fitted Gaussians from corrupting the results, unreasonable parameters such as multiple maxima points, a negative amplitude, or an extremely high or low expected value all cause the respective score to be replaced with a high constant score, used as a flag.

Third, the expected value retrieved from the Gaussian of the chosen depth is used to update the exact ($x_s,y_s$) location of the seed point. This procedure is repeated for all image frames, where each time the initial z coordinate of the seed point is the one found from the preceding frame [$z_s(t-1)$], based on the assumption that the data are smooth enough because of the high framerate. The expected smoothness between frames may be used by applying a smoothing filter for each seed coordinate vector: $x_s$, $y_s$, and $z_s$.

Thus, for each depth in the search area, the following is calculated: sum of the absolute gradient of the amplitude image in the region defined by the binary mask (which is minimal at the plane of focus for pure phase objects such as biological cells), the sum of the negative values of the phase image in the region defined by the binary mask (which is indicative of phase-unwrapping issues characteristic of out-of-focus frames), and a sparsity metric of the gradient of the complex field in the region defined by the binary mask. Then, the smoothed parameter vectors (normalized parameter vectors) obtained for the entire depth range are used to calculate a triple score vector, given by the element-wise multiplication of the first two divided by the third. The depth with the lowest score corresponds to the ideal focus plane.

In order to achieve more precise segmentation, all OPD image frames may be resized to be larger (e.g. four times larger), returning them to the original hologram dimensions. For each frame, the segmentation of the sperm cell head from the original image may include rough segmentation and fine segmentation. More specifically, initially, in the rough segmentation, the original image is segmented using a threshold of 0.6 radians on the phase values, followed by morphological closing and opening. This initial segmentation is used to estimate the centroid of the remaining object (which is mostly the head and possibly some of the midpiece), allowing the image to be cropped such that it is centered on the head portion.

Thereafter, the orientation of the ellipse that has the same normalized second central moments as the binary mask is calculated, allowing the image to be rotated such that the head is placed horizontally, with the neck at the left and the acrosome at the right.

The further fine-tuning step of the segmentation is based on the fact that the acrosome is in the right half of the image, to apply more intensive, targeted cleaning to the left part, effectively and accurately erasing the midpiece area from the unsegmented phase image, leaving the head portion. In this regard, it should be noted that for frames where the sperm cell is rotated on its side, the acrosome area becomes very thin at the midpiece area and may be accidently erased if this cleaning is applied to the entire image. Thus, for the left third of the image, a threshold of 0.9 radians may be applied on the phase values, followed by morphological opening with a structuring element that is a vertical line (unlike the usual disk-shaped structuring element), effectively erasing the midpiece area with minimal damage to the rest of the cell. For the right two-thirds of the image, a much lower phase threshold of 0.35 radians is applied.

The resultant binary mask is then used to more accurately center and rotate the image, as well as to extract the minor and major axis radii of the ellipse that has the same normalized second central moments. Centering is performed for the bounding box enclosing the binary mask.

The segmented maps, e.g. prepared using the above technique, are then used to perform the recovery of the head portion orientation, by the above described fitting procedures, i.e. 3D fitting. The following is a specific not limiting example of the implementation of this process:

To estimate the 3D orientation of the sperm cell head for each frame, it is modeled as ellipsoid, whose structure may be described via the characteristic spatial dimensions [A,B, C], being major and minor radii of the ellipsoid:

$$(x/A)^2 + (y/B)^2 + (z/C)^2 = 1$$

where it can be assumed from the standard dimensions of sperm cell heads that B>>A>C.

The final orientation of the sperm head is found that yields the same projected ellipse as the rotated ellipsoid model and not necessarily the stand-alone values of the pitch, roll, and yaw angles as 3D rotation is not commutative (i.e., the order of rotation matters). The determination of the model constants (A,B,C), as well as the affiliation of the pitch, roll, and yaw angles to the different frames, relies completely on the minor and major axis radius vectors that can be calculated for the binary masks of the respective projections of the head (as described above).

In order to prevent possible localized segmentation errors from corrupting the results, a smoothing filter can be applied to each vector, relying on the smoothness that can be expected at high framerates. Examples of the major and minor radius vectors obtained for a head portion of a sperm cell, before and after smoothing, are shown in respectively FIGS. 6A and 6B, demonstrating the repetitive nature of sperm head rotation during free swim.

The roll angle $\theta$ for each frame can be found as follows: The roll angle is defined to be the angle of rotation around the longitudinal axis of the sperm cell head (y axis in FIGS. 3A-3C). Because of the periodic nature of sperm head rolling during free swim, as shown in FIG. 6A, constants A and C can be reliably estimated as the maximal and minimal values of the minor radius vector, respectively. Once constants A and C are known, and under the ellipsoid model assumption, the roll angle $\theta$ associated with each frame can be inferred within a 90° range from the minor radius of the projection. Practically, this can be done by calculating half the length of the projection of the ellipse shown in FIGS. 3A-3C for a finite number of rotation angles in a 90° range, and then using interpolation to determine the exact angle $\alpha_{90}$ suitable for every measured minor radius length.

Then, angles over a 360° range are retrieved. This can be implemented utilizing continuity considerations to find the proper quadrant, as long as a high framerate is maintained. For example, each segment can be labeled between two extrema with a sequential integer $N_q$, and the angle within a 360° range can be retrieved by applying the following rule:

$$\theta_{360} = \begin{cases} \theta_{90}, & \text{if } N_q \bmod 4 = 1 \\ 180 - \theta_{90}, & \text{if } N_q \bmod 4 = 2 \\ 180 + \theta_{90}, & \text{if } N_q \bmod 4 = 3 \\ 360 - \theta_{90}, & \text{if } N_q \bmod 4 = 0 \end{cases}$$

It should be noted that relying on locating extrema defines the minimal required framerate to be four frames for a full revolution, yet accuracy improves markedly with much higher framerates. For example, FIG. 6A shows approximately 250 frames per full revolution.

The direction of the rolling can be addressed as follows: The sperm cell can rotate either clockwise or counterclockwise and can generally change its rotation direction during swim. Nevertheless, for the short recording duration needed for the reconstruction, the rotation direction can be considered constant, because of a smooth periodic minor axis vector as illustrated in FIG. 6A. In order to automatically determine the directionality of the rotation for each sperm cell, the 3D vector can be determined indicating the location of the neck over time (based on the "seed points"). Specifically, assuming that the forward motion of the sperm is primarily in the y direction, the x and z coordinate vectors are to be found. To determine rolling polarity, a gradient (numerical difference) of the x coordinate vector, $g_x$, can be determined and used to calculate two parameters: $V_H$, which is the sum of all z coordinate values of image frames for which $g_x > 0$, and $V_L$, which is the sum of all z coordinate values of image frames for which $g_x < 0$. Then, if $V_H > V_L$, the rotation direction is determined to be clockwise and vice versa.

Figures 7A, 7B:
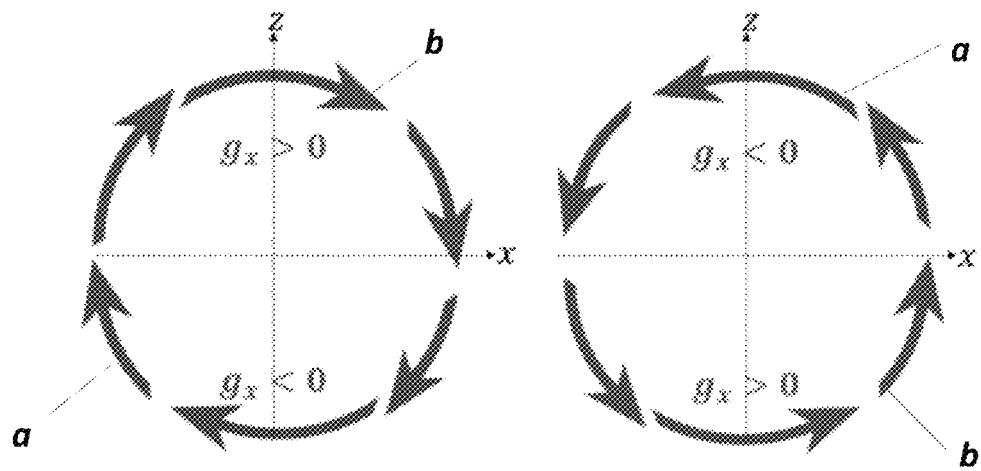

The principles of the above described technique of finding the sperm head roll direction are illustrated in FIGS. 7A-7B, where arrows a indicate $g_x < 0$, and arrows b indicate $g_x > 0$. FIG. 7A shows the clockwise rotation direction: higher values of z are obtained for the arrows b ($g_x > 0$), and FIG. 7B shows the counterclockwise rotation direction: higher values of z are obtained for the arrows a ($g_x < 0$). If for a positive change in x (arrows b) higher values of z are obtained than for a negative change in x, then the case of FIG. 7A is true; otherwise, this is the case of FIG. 7B.

It should be noted that this calculation can be applied in an identical manner by switching the roles of x and z (and calculating $g_z$). If the rotation is counterclockwise, the roll angles just need to be corrected to be $\theta = -\theta_{360}$. It should also be noted that the above calculation has to be performed only once for the first few dozen of frames, assuming that the cell does not change its rotation polarity.

The pitch angle $\chi$ for each frame can be determined as follows: The pitch angle is defined as the elevation of the head portion relative to the camera/image plane, i.e. (x-y) plane (i.e., rotation around the x axis in FIGS. 3A-3C). The pitch angle $\chi$ is related to the major axis radius, yielding a maximal value whenever the sperm cell head is aligned with the camera plane (i.e., $\chi = 0$). Thus, zero crossings of $\chi$, which are sign-switching events, can be found from the global positive extrema of the major radius vector.

Generally, for freely swimming/disposed sperm cells, the pitch angle $\chi$ displays a more complex rotation pattern than the roll angle $\theta$. For example, the patterns presented in FIGS. 6A-6B show a zero crossing for pitch angle $\chi$ after every full revolution in roll direction $\theta$. The correlation between the peaks in the major and minor radius vectors, where the global positive extrema of the major radius vector are a subset of the negative extrema of the minor radius vector, allows determining the zero crossings of $\chi$ in a more reliable manner that is less sensitive to noise.

The remaining constant of the model (B) can then be found from the average value of the global positive extrema in the major radius vector. Once all three constants A, B, C are found, the pitch angle $\chi$ associated with each image frame can be inferred from the major radius of the projection. Practically, this is done by rotating the 3D ellipsoid according to the recovered roll angle $\theta$ for that frame, and then rotating it for a finite number of pitch angles within a 50° range, followed by calculating the major axis radius of each resultant projection.

Then, interpolation may be used to determine the exact pitch angle value $\chi$ suitable for every measured major radius length. It should be noted that a larger range than 50° might be redundant, as long as the primary forward motion of the sperm cell is in the y direction.

Once the value of the pitch angle $\chi$ is found for all the image frames, it is assigned with a proper sign, where each zero crossing of the pitch angle value $\chi$ is expected to cause a sign switch, and a selection is to be made whether the even or odd segment numbers receive a negative sign. To determine this, the z location vector of the neck, $z_{neck}$, can be compared to the z location vector of the head, $z_{head}$, which have been determined during the segmentation and focusing procedures as described above. Generally, it might be expected that $z_{head} > z_{neck}$ for $\chi > 0$ and vice versa. Practically, however, this condition is not always in this particular embodiment fulfilled for every sample. Nevertheless, if the overall trend per segment between two zero crossings of the pitch angle value $\chi$ is checked, it allows to reliably estimate which segments are positive and which are negative.

The yaw angle $\alpha$ for each frame can be determined as follows: The yaw angle is defined by the rotation in the camera (x-y) plane (i.e., rotation around the z axis in FIGS. 3A-3C). The recorded yaw angle $\alpha$ has already been found from the orientation of the ellipse that has the same normalized second central moments as the binary mask during the segmentation procedure with respect to the head portion, as described above, and needs not be an input to the reconstruction procedure, as all sperm cell heads have already been rotated in (−$\alpha$) to achieve a horizontal position. However, for nonspherical objects, the combination of non-zero roll and pitch inevitably creates a small yaw angle $\alpha_0$, which is to be determined and compensated when preparing the phase image to be located in the native position for the tomographic reconstruction. This small angle can be found for each frame by rotating the 3D ellipsoid model according to the previously determined roll and pitch angles, and then determining the orientation of the ellipse that has the same normalized second central moments as the binary mask of the resultant projection. It should be noted that for recovering the 3D orientation of the sperm cell head for motion pattern reconstruction, a yaw angle of ($\alpha-\alpha_0$) may be imposed, mimicking the measured yaw angle.

As described above, some embodiments of the presently disclosed subject matter also provides for separate determination of the 3D shape of the flagellum and midpiece portion of a sperm cell, in each image frame in the sequence, so that the dynamics of the sperm cell can be determined. The operation of the position recovery utility of some embodiments of the presently disclosed subject matter with respect to the flagellum and midpiece portion is generally similar to that described above with regard to a head portion, namely, model data is provided, the OPD image frames are processed to create position data of the flagellum and midpiece in the image frames. However, for flagellum and midpiece portion, the position data determination includes segmenting the flagellum and midpiece portion in the image frame into a chain of sub-portions, each modeled by the 3D primitive shape having axial symmetry about its roll axis, which is referred to in this description as cylinder-like shape.

Figure 8:
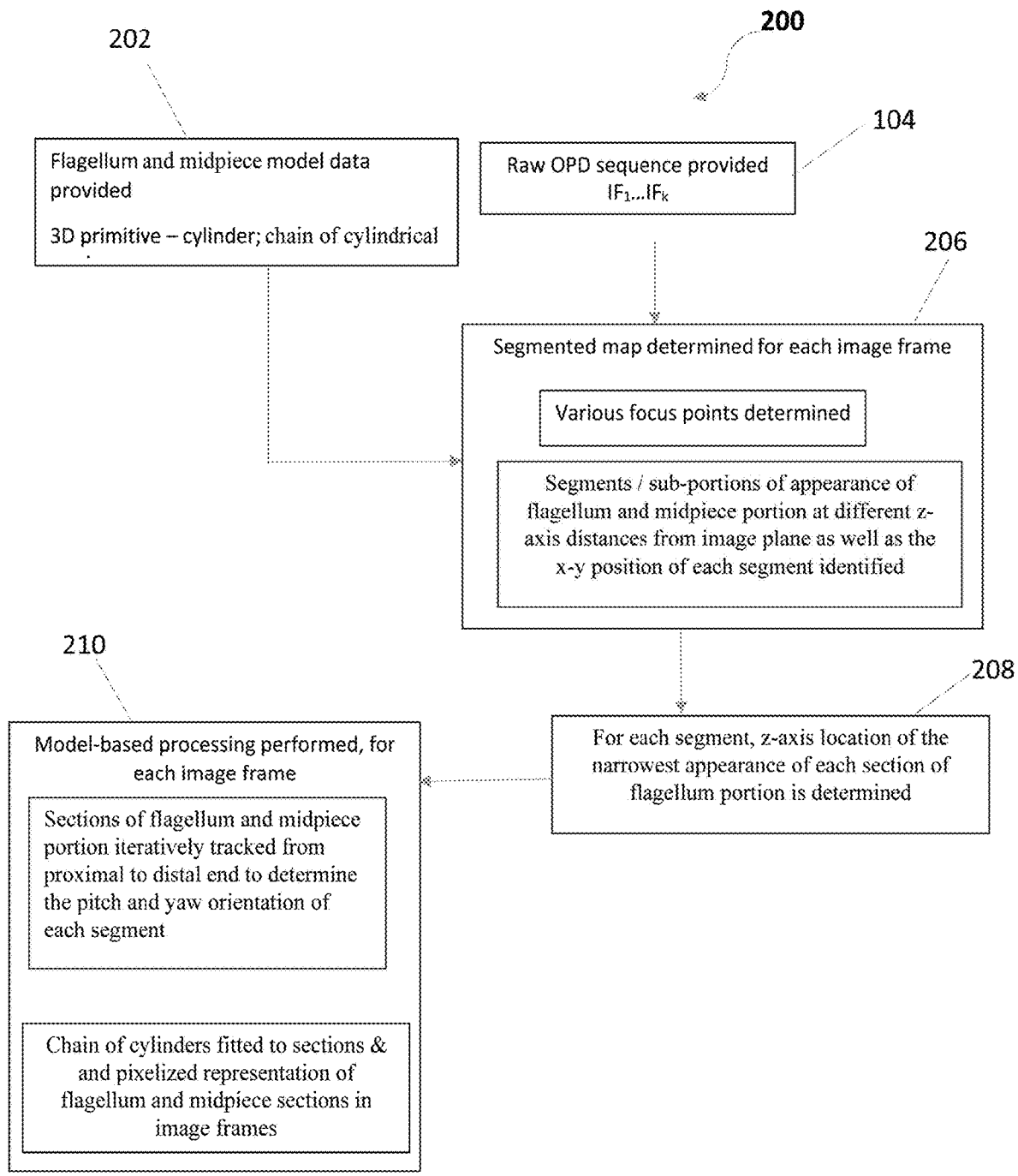
FIG. 8 exemplifies the system operation to determine position data for the flagellum portion of a sperm cell, according to embodiments of some embodiments of the presently disclosed subject matter.

Reference is made to FIG. 8 exemplifying a flow diagram 200 of the operation of the above-described system 10 to determine position data for the flagellum and midpiece portion. The model data for this portion of the cell is provided—step 202. The 3D primitive structure descriptive for the flagellum portion is a cylinder, and the model describes the flagellum portion as a chain of cylindrical sections. The model data for 3D localization/position of a flagellum portion may be based on a superposition of point-like scatterers. For example, in the case of a rod, although it may scatter weakly if viewed through one of its short axes, this is not the case when viewed through its long axis (i.e. if it is aligned along the optical axis).

The position recovery module (18C in FIG. 1) performs the model-based processing on the flagellum portion in each image frame to create segmented map for each image frame—step 206. This is applied to successive sections of the flagellum portion in the image frame to determine various focus points of these sections, and determine the segments of appearance of flagellum portion at different z-axis distances from an image plane, and determine, in each segment, a z-axis location associated with a narrowest appearance of each section of the flagellum portion—step 208.

In this regard, it should be understood that for reconstruction of the flagellum portion, optical wavefront (OPD image frame) is to be reconstructed at different distances from the image plane, and z-coordinate location of each pixel associated with the sperm flagellum can be determined by finding the narrowest, most steep area of the flagellum in the phase image z-stack. However because of the low-contrast nature of the flagellum it is hard to properly locate the relevant pixels from the 2D image, especially considering the fact that large portions of the tail are blurred due to their distance from the plain of focus. Therefore, some embodiments of the presently disclosed subject matter utilizes a spatio-temporal proximity principal, i.e. 4D segmentation, based on looking for the next location within a fixed bounding box to track the sperm tail, which is a robust solution.

The model-based processing is applied to the so-created segmented map of each image frame—step 210. This includes iteratively tracking the sections of the flagellum portion of each segment from its proximal to distal end to determine the pitch and yaw orientation of each segment, and fitting the modeled chain of cylinders to the sections of the flagellum and determining pixelized representation of the flagellum sections in the image frame. It should be noted that the processing of the image frame also includes distinguishing between midpiece and non-midpiece parts of the flagellum and midpiece portion to separately process respective parts of the image frame by using first and second 3D primitive cylinder structures, respectively. The pixelized representation of the flagellum and midpiece sections is processed by determining a global average, over all the image frames, of a maximal phase value and a width of the section for each of the first and second groups (the width of the section is determined as a thickness of a central pixel of the section).

The following is the description of a specific example of the technique of some embodiments of the presently disclosed subject matter for recovering the 3-D position of the flagellum. The latter spans over various axial locations in each frame, and the reconstruction of the optical wavefront should be performed for different distances from the image plane. To this end, the Rayleigh-Sommerfeld back propagator may be used, and determination of the z location of each pixel associated with the sperm flagellum is performed by finding the narrowest, most steep area of the flagellum in the phase image-based z stack (i.e. OPD image data), for a section perpendicular to the flagellum orientation at that pixel.

Applying the known digital-propagation holographic principle to locate the various focus points of the flagellum is not trivial, because of the fact that the flagellum is as thin as the resolution limit and is masked by coherent noise. The inventors therefore developed the 4D segmentation technique based on tracking the flagellum from its proximal to distal end for each OPD image frame by estimating the current segment direction and following it iteratively. This 4D segmentation process takes advantage of the fact that under high framerate, the flagellum location may only vary by a small increment between consecutive frames. Thus, for each frame, the segmentation result from the preceding frame is used to create a weighted probability map, where pixels associated with the preceding frame and their closest neighbors are of the highest likelihood to be associated with the current frame as well, and normalization (L2-norm) for farther pixels quickly drop to zero probability, preventing deviation from the flagellum. This technique is exemplified in more details below.

Figure 9A:
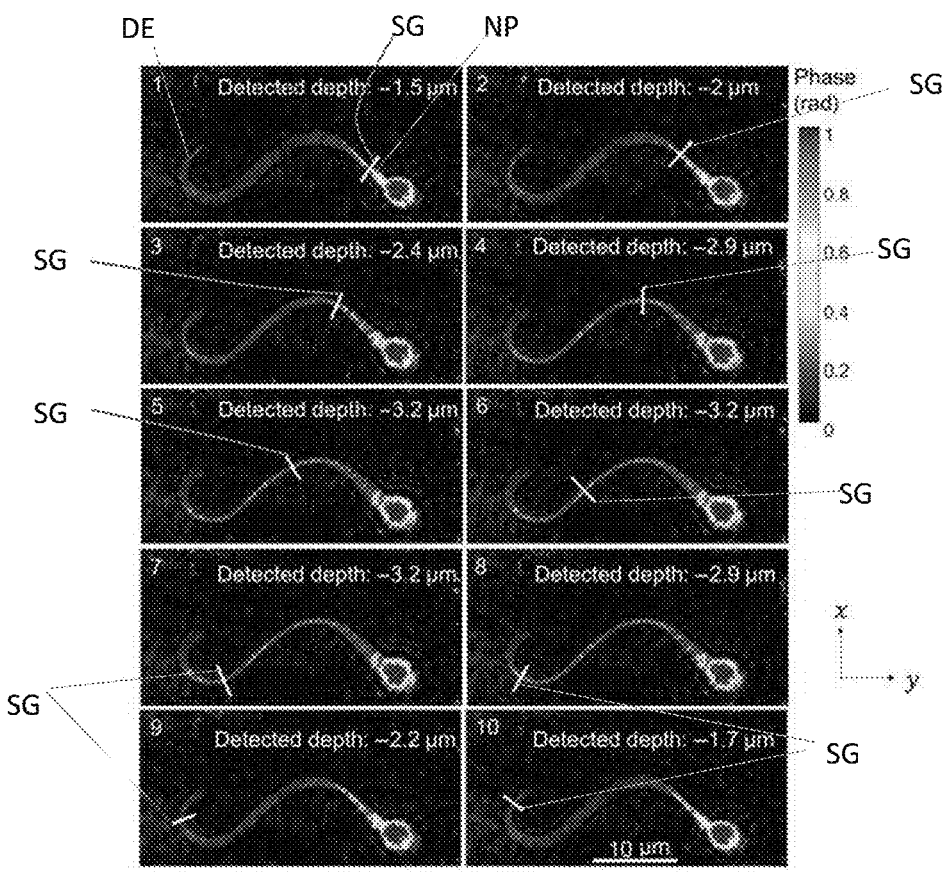
Figure 9B:
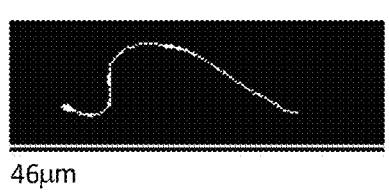
Figure 9C:
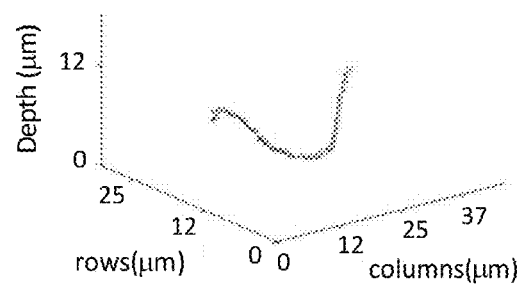
Figure 9D:
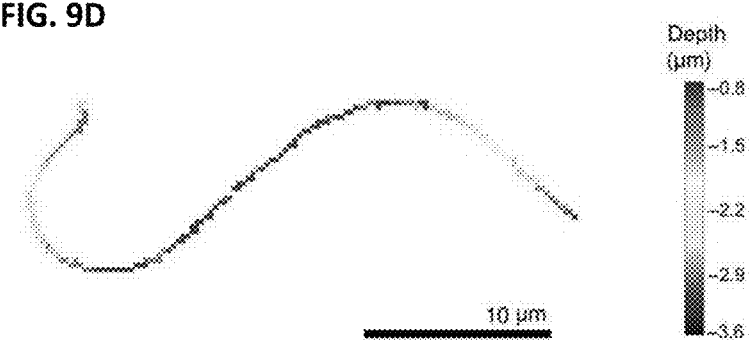

A representative result obtained by applying the above approach is shown in FIGS. 9A-9B. FIG. 9A shows the digital focusing in action. Segment SG moves along the flagellum from the neck NP to the distal end DE, in the order indicated by the numbers in the top-left corners, finding the ultimate focus at each location. Color bar indicates phase values in radians. All the images in the figure are retrieved from a single digital OPD image (corresponding to off-axis hologram in this example), acquired in a single camera shot. FIG. 9B shows a 2D segmentation map the flagellum, and FIGS. 9C and 9D exemplify the complete 3D segmentation map of the flagellum, where in FIG. 9D the color map indicates the recovered depth (z coordinate) relative to the original focus plane. FIG. 9E shows 3D segmentation result from two viewpoints.

In this example, the entire flagellum is considered as a single pixel-thin unit. However, the portion of the flagellum closest to the sperm head, i.e. the midpiece, is a thicker region composed of a central filamentous core encircled by many mitochondria. The cylindrical axisymmetrical morphology of the midpiece, and the fact that it cannot be regarded as a single rigid body together with the sperm head, do not allow for the same orientation recovery principles applied for the sperm head to be applied for the flagellum. The inventors therefore divided all flagellum pixels into two groups: midpiece region and non-midpiece region, and calculated a global average (over all the image frames) of the maximal phase value and width of the section for each group. These average values are then used to calculate the integral (thickness-averaged) refractive index for each region, under the assumption that each region is a cylinder, such that the thickness of the central pixel is equal to the width of the section. This will be exemplified further below.

In order to properly trace the 3D location of the flagellum per each image frame, the pixels associated with the tail portion (non-midpiece portion) are to be found in the 2D image (2D projection). This is done by performing 2D segmentation.

This is a complex procedure because of the low-phase values of the flagellum, which are similar to the noise level when using a coherent light source, especially for out-of-focus segments. The inventors constructed a targeted, adaptable, locally conserving cleaning (TALCC) function, which is applied to the image data to identify the one of the many important parts of the image that need to be locally conserved. This function is highly targeted and adaptable because of its multiple inputs, including, in addition to the original OPD image frame, such inputs as the binary segmentation map, row and column of interest, slope in region of interest, and noise level mode. The noise level mode starts at a value of 0, indicating a neutral input, and can take higher positive values for dealing with increasingly higher noise levels that can require robust cleaning or lower negative values for dealing with thin, low-contrast segments that need delicate cleaning. The row and column of interest, together with the slope in region of interest, are used to define a 3×6 pixel environment around the row and column of interest that needs to be preserved, defined as 1 pixel to each side, 4 pixels forward and 1 pixel backward, rotated in the direction of the slope.

The input phase map is first thresholded to obtain a binary image, with a threshold value respective to the noise level mode. Then, both the pixel group defined by the 3×6 pixel environment and the pixel group marked as the object in the segmentation map of the current image frame (and preceding frame, if available) are marked as the object in the binary image. At this point, morphological opening and closing techniques are subsequently applied to clean noise and close holes, respectively, with parameters according to the automatically detected noise level mode. The structuring elements used are lines with a slope either parallel or orthogonal to that of the region of interest, thus preserving segments with similar direction and erasing others. In the case of low-contrast segments, indicated by a negative noise level mode, the closing operation is applied before the cleaning operation, and the structuring elements used are disk shaped.

The following is the description of the specific example of the segmentation procedure with regard to the flagellum portion of a sperm cell.

To apply 3D segmentation of the sperm cell flagellum for each image frame, iteration within a loop is performed that starts with the seed point of the respective image frame, $[x_s(t), y_s(t), z_s(t)]$ and runs until it reaches either the boundaries of the image or a stopping criterion. Hence, parts of the tail that are connected to each other can be traced and not parts that exit the field of view and return in a secondary location. Within such loop, a recursive function is applied, which outputs the coordinates of the next voxel associated with the tail as well as a flag parameter, indicating whether the stopping criterion has been reached. The general principles of the recursive function are known and need not be specifically described, except to note the following:

Recursive function defines some concept or property of one or more variables, which is specified by a procedure that yields values or instances of that function by repeatedly applying a given relation or routine operation to known values of the function. In this specific case, recursive function takes, as an input, the coordinates of the last voxel that has been identified, the reconstructed complex field stack (OPD-based wavefront) for that image frame, two types of location maps, an iteration-counting parameter, the slope of the current segment, the noise level mode, and a validity flag variable initialized as a positive integer. The first type of location map stores nonzero values in (x,y) locations identified as being associated with the flagellum, and the second type is based on the first type of the preceding frame.

FIGS. 10A and 10B exemplify two such location maps used for the recursive function (findFOC) for processing the image frames shown in FIGS. 9A-9B. Here, the location map shown in FIG. 10A is the original binary location map (OLDMAP) restored from frame t (preceding frame) and the location map shown in FIG. 10B is the weighting map (OLDMAP2) being a weighted, dilated version of the original binary map used for preventing deviation from the flagellum in frame t+1 (successive frame).

For the first iteration of each frame, the following is used: the coordinates of the seed point and the estimated slope at the neck ($S_n$), calculated as described above with regard to the head portion of a sperm cell, and a neutral, zero noise level mode. For the first frame being processed, an altered version of the function is used that does not require the use of the second type of location maps.

The recursive function is composed of four main parts, including: initial estimation of current segment direction and $(x_i, y_i)$ coordinates of the next voxel associated with the tail; estimation of the $z_N$ location of the estimated $(x_i, y_i)$ coordinate; validity check of the result and recursion; and final estimation of the current segment direction and $(x_N, y_N)$ coordinates of the next voxel associated with the tail.

More specifically, in the first part, the phase profile for the depth is determined being estimated from the previous voxel ($z_0$) and cleaned by multiplying it by the weighting map "OLDMAP2" (for findFOC0 recursive function: using the TALCC function, with the parameters calculated from the previous iteration). Then, the slope at the previous location ($x_0,y_0$) is estimated: if the iteration counting parameter is lower than 10, indicating that the current location is near the head, the slope is calculated based on thresholding the phase image to leave the head, and take the orientation of the ellipse that has the same normalized second central moments as its binary mask. Otherwise, the "OLDMAP" (for findFOC0: hitc) binary mask is cropped using a fixed window size around ($x_0,y_0$), and the orientation of the remaining object is estimated. This procedure provides the non-unique slope within a 180° range: $-90° \rightarrow 90°$; to find the slope within a 360° range, which is crucial for moving forward with the tail rather than backwards, the gradient of the hit location map is calculated (rotated according to the non-unique slope), the sign of which indicates the directionality of the search.

To add to the reliability of the procedure, certain continuity in the slope relative to the previous estimation is assumed. This calculated slope, namely $S_N$, is used to define a 5×3 pixel environment around ($x_0,y_0$), defined as two pixels to each side, and two pixels forward, rotated at the direction of the slope. Finally, a search is performed for the clean phase profile in the calculated environment, excluding pixels already flagged as visited by the "hitc" location map (which are flagged as "0"s), for the maximal value, the location of which yields the initial estimation of the ($x_i,y_i$) coordinates of the next voxel associated with the flagellum. If the maximal value found is "0", indicating that all locations in the environment have been visited, a validity flag of 0 is defined returning to the calling function immediately.

For the estimation of the $z_N$ location of the estimated ($x_i,y_i$) coordinate, the possible range of depths is found based on continuity and smoothness considerations, both relative to the current and previous frame (meaning in 4-D). To this end, the depth range is first extracted from a 5×5 pixel environment in the "OLDMAPz" map, defined as two pixels to each side, and four pixels forward, rotated at the direction of the slope, starting at ($x_i,y_i$), and its median, $z_m$ is calculated. Then, the depth range is extracted from a 5×3 pixel environment in the "hitz" map, defined as two pixels to each side, and two pixels backward, rotated at the direction of the slope, starting at ($x_i,y_i$), and its median, $z_p$ is calculated. This information is then used as follows:

If $z_m < z_p$ – take [$z_p - 2$, $z_p$]

if $z_m > z_p$ – take [$z_p$, $z_p + 2$]

if $z_m = z_p$ (or there is no sufficient information in the area defined by the 5×5 pixel environment in the "OLDMAPz" map), take [$z_p - 2$, $z_p + 2$].

Then, a linear section is examined being centered around ($x_i,y_i$) which is orthogonal to the direction of the current segment (based on $S_N$), for the calculated depth range, taken from an image cleaned with the TALCC function. For every depth inside this window, the standard deviation is calculated, as well as a score expressing the likelihood of it being the location of optimal focus, based on the following parameters: weighting according to distance from the center of the estimated depth range (assuming smoothness, it is most likely for the depth of the following pixel to be identical to the current one, slightly less likely for it to differ by ±1 and increasingly less likely as going further); the width of the segment (number of pixels with value above threshold); and The amplitude of the section (value of highest peak).

In order to minimize the effect of local noise, the width and amplitude vectors are smoothed with a Savitzky-Golay filter, with a window size equal to the vector length. Then, the distance weighting, width, and amplitude vectors obtained for the entire depth range are used to calculate a triple score vector, given by the element-wise multiplication of the distance weighting and width vectors, divided (element-wise) by the amplitude vector. The validity of the score, which is linked to the noise level of the image, might need to be checked. If the image is noisy even after the TALCC function, the width parameter would be unreliable, as it may include background pixels. On the other hand, if the cleaning was too aggressive, there might be excluded pixels that should have been counted. Thus, the score is replaced with a constant large number (e.g. 1000) in the following cases:

The amplitude value is 0;
The segment has no maximum points (shape is wrong);
The width of the segment is higher than a threshold (fixed on a different value in the thicker mid piece area than in the narrow flagellum area);
The width of the segment is 2 pixels or less, and the width of the respective segments in adjacent depths differ by over 2 pixels (that may be associated with a mistake in segmentation);
Additional condition relevant for none-mid piece area: the segment has minimum points (the shape might be wrong).

Finally, the closest neighbors of the depths that got the high constant number—get their score doubled as s penalty, assuming that it less likely for a depth adjacent to the focus plain to be invalid.

It should be noted that the determination of being out of the mid-piece area is based on counting the identified pixels in the frames to be higher than a fixed threshold. Since the mid-piece area is characterized by a thicker segment, such that it can endure more rigorous cleaning on the one hand, and is less sensitive to the noise detection criteria on the other hand, a higher noise level mode is used when cleaning it with the TALCC function.

Finally, the depth with the lowest score—thus with the steepest, most narrow segment (that did not fall into any of the categories above)—corresponds to the ideal focus plain, yielding the depth of the current location—$z_N$. If the value of the lowest score is the high constant number used as a flag, the noise level is still too high and a "0" noise flag is returned to the calling function. Also, return to a "0" noise flag (indicating high noise levels) to the calling function is done if it is detected that current location is out of the mid piece area with a noise level mode lower than 3 (meaning more rigorous cleaning was not applied) and there is either a jump of more than 2 pixels in the width vector (indicating unrelated pixels attributed to the count), or more than one depth with an invalid shape.

Then, two additional global parameters are calculated to return to the calling function, indicating whether excessive cleaning or that the end of the flagellum is reached, which are as follows: The mAMP parameter, storing the maximal value of the amplitude vector; The mSTD parameter, storing the maximal value of the standard deviation vector (calculated for the raw, uncleaned phase image).

In order to validate the result and recursion, the output of the above checks is analyzed to decide whether the result is valid, more/less cleaning is needed, or whether the end of the flagellum has been reached. The decision is made as follows: If the current noise level mode is non-negative (indicating neutral or high noise) but smaller than 5 (to prevent an infinite loop) and the noise flag from the previous step is 0: the findFOC function is called again with a noise level mode increased by 1, with all the initial parameters, including $(x_0, y_0, z_0)$.

If the current noise level is non-positive (indicating neutral noise or delicate segments) but larger than −3 (to prevent an infinite loop), and mAMP or mSTD are lower than a fixed threshold, then the findFOC function is called again with a noise level mode decreased by 1, with all the initial parameters, including $(x_0, y_0, z_0)$.

If none of the above conditions is met and mAMP or mSTD are lower than a fixed threshold, then a validity flag of 0 is defined, indicating that the end of the tail has been reached for this frame (stopping criterion).

If none of the above conditions is met, a validity flag of 1 is defined, indicating that the estimation of $z_N$ is valid.

Then, the final estimate of the current segment direction and $(x_N, y_N)$ coordinates of the next voxel associated with the tail is performed, which is executed once for the recursion base, with the updated noise level mode value. To this end that-above described first step is repeated using the updated depth $z_N$, estimated as described above. If the phase value of $(x_N, y_N, z_N)$ is below a fixed threshold, a validity flag of 0 is defined, indicating that the end of the tail has been reached for this frame (stopping criterion)

Thus, for each image frame, the iteration is performed until a stopping criterion is reached based on cumulative indications that the end of the flagellum may have been detected. If the flagellum detection has ended before exiting the field of view, then the Euclidean distance between the current and preceding end point is checked: if it is larger than a fixed threshold, it is assumed that an error has occurred in this specific frame (as may occur because of high local noise), and this frame is defined as invalid, and the previous frame is used again instead, slightly increasing the distance tolerance for the next frame.

Some embodiments of the presently disclosed subject matter provides a novel approach for model-based processing of a sequence of OPD images to properly determine 3D position data of various portions of a biological cell, such as a sperm cell, which enables reconstruction of refractive index profile of the cell by applying any known suitable technique based on general tomography principles, as will be exemplified further below. The novel 3D position recovery technique of some embodiments of the presently disclosed subject matter advantageously provides for using stain-free 4D imaging to capture the entire sperm cell during free swim, including both the head with its internal organelle morphologies and the flagellum, based on a single-channel holographic video.

Other than the clear benefit for clinicians, allowing 4D visualization for a more informed selection of sperm cells, the technique of some embodiments of the presently disclosed subject matter provides for calculation of the volume and dry mass for each of the organelles, thus adding previously inaccessible quantitative parameters for clinical use or biomedical assays.

The technique of some embodiments of the presently disclosed subject matter can be applied to a sequence of OPD image frames obtained by optical tomography, which is enabled by the fact that sperm cells rotate their head during swim, allowing access to their interferometric projections by the above described technique. Considering reconstruction of the refractive index profile of a sperm cell, some embodiments of the presently disclosed subject matter is based on the fact that progressive swimming pattern of sperm cells is characterized by typical repetitive rotation of the sperm head, including continuous unidirectional rolling across 360°, a condition that is fulfilled for most of the cells; and also is based on that a single cell crosses the field of view each time. Sufficient acquisition framerate is crucial both for applying the temporal proximity principle in the 4D segmentation of the flagellum and for properly recovering the 3D orientation of the sperm head. For 4D segmentation of the flagellum, as described above, the average displacement between consecutive frames is to be 1 pixel or less. For recovering the orientation of the head, the affiliation of the roll angle to the different quadrants, as well as the sign determination of the pitch angle, relies on sufficient temporal sampling. For the requirement of affiliation of the roll angle to the different quadrants, which is typically more demanding, the two extrema at 0° and 180° are to be detected for each full sperm head revolution. Thus, according to Nyquist's theorem, the minimal required framerate is defined as four frames per full revolution (360° roll) of the sperm head. Nevertheless, accuracy improves markedly with much higher framerates. Specifically, in the experiments conducted by the inventors the framerate of 2000 fps was used, and the sperm head rotated at 8 revolutions/s; there were approximately 250 frames per full head revolution. It should be noted that, although the proper tomographic reconstruction can require an overall sufficient number of projections to properly fill the 3D Fourier space of the object, this does not necessarily mandate a high framerate. The experiments conducted by the inventors used 1000 frames, taken over four full head revolutions.

As described above, the sperm head is assumed as being a rigid body and having the constant/stable internal structure that does not change throughout the recording/imaging process, and only its orientation can be changed. The inventors have experimentally performed reconstruction of the refractive index profile of the head portion based on four head revolutions, recorded over half a second, thus enabling the refractive index distribution to be updated twice every second during free swim. Considering the fast acquisition rates, efficient digital implementation of some embodiments of the presently disclosed subject matter provides for near real-time visualization.

The head recovery process may be performed once per sperm cell (using the first few hundreds of frames), to obtain the model constants and the 3D reconstruction of refractive index of the head. Then, the position (orientation) recovery for new (successive) frames can be updated in small groups in real time. The following is the example of the refractive index profile reconstruction performed (by analyzer utility 18C in FIG. 1) based on the 3D position data obtained as described above (performed by position recover utility 18B).

The inventors utilized the exemplary interferometry-based system illustrated in FIG. 2 described above to obtain a sequence of OPD image frames on a semen sample, which has been properly treated, and one milliliter of the cell solution was then placed in a chamber for imaging. It should be noted, and is also indicated above, that the general principles of acquisition and provision of a sequence OPD image frames, as well as those of refractive index profile reconstruction, can be based on any known suitable techniques, while determination of the 3D position data needed for such reconstruction is performed by the technique of some embodiments of the presently disclosed subject matter as described above being applied to raw OPD data and providing segmented map data together with the recovered 3D position data of the segments as input for reconstruction procedure.

As described above, an interferometric system is capable of recording the entire wavefront that propagated through a sample, rather than just its intensity, by interfering it with a reference wavefront, yielding a digital hologram or interferogram. The resultant hologram is given by the following expression:

$$|E_s(x, y) + E_r|^2 = |E_s(x, y)|^2 + |E_r|^2 +$$
$$A_s(x, y)A_r \exp[j\varphi_s(x, y) - j\varphi_r] + A_s(x, y)A_r \exp[j\varphi_r - j\varphi_s(x, y)]$$

where j denotes the imaginary unit, and $E_s(x,y)$ and $E_r$ are the sample and reference complex wavefronts, respectively (the latter assumed to be of constant phase and amplitude) determined as:

$$E_s(x, y) = A_s(x, y)\exp[j\varphi_s(x, y)] \text{ and } E_r = A_r\exp[j\varphi_r].$$

Thus, the wavefront that propagated through the sample is fully conserved, although its extraction remains difficult. In off-axis holography, one of the interfering beams is titled at a small angle relative to the other, creating a linear phase shift that allows separation of the field intensity from the two complex-conjugate wavefront cross-correlation terms in the spatial frequency domain, thus allowing reconstruction of the complex sample wavefront from a single off-axis digital hologram. In the present example, the complex wavefront was extracted from the raw hologram in the spatial frequency domain using a Fourier space-filtering algorithm (21), which cropped one of the cross-correlation terms, and then applied an inverse Fourier transform to obtain the complex wavefront. For efficiency reasons, the images were left at their cropped dimensions, four times smaller than the original hologram dimensions.

Following this, the Rayleigh-Sommerfeld (RS) propagator was used to reconstruct the complex field at various distances from the recorded plane of focus [18], a propagation method suitable for weakly scattering objects (such as the sperm cell flagellum). Here, one can take advantage of the transition to the Fourier space needed for isolating the wavefront and use the Fourier formulation of the Rayleigh-Sommerfeld propagator, simply requiring a pixel-wise multiplication of the cropped cross-correlation term with the following transfer function:

$$H_{RS}(u, v, z = d) = \begin{cases} \exp\left[j\frac{2\pi n_m d}{\lambda}\sqrt{1 - (\lambda u)^2 - (\lambda v)^2}\right], & \text{for } \sqrt{u^2 + v^2} < \frac{1}{\lambda} \\ 0, & \text{otherwise} \end{cases}$$

where d is the distance to be propagated, $n_m$ is the refractive index of the surrounding medium, j is the imaginary unit, and $\lambda$ is the illumination wavelength.

Thus, the wavefront propagation may be regarded as a linear, dispersive, spatial filter with a finite bandwidth. The refocused wavefront at z=d can then be obtained by applying an inverse 2-D Fourier transform on the result. The spacing between the different reconstruction planes can be chosen to be exactly the effective pixel size of the image (which was identical for horizontal and vertical coordinates), resulting in a pseudo-volume with isotropic sampling frequency. The boundaries of the propagation distance can be determined by the maximal depth allowed by the physical restriction used in the experiment. To prevent excessive memory use, a propagation distance of 16 µm was used in the experiments, taking into consideration that the human sperm cell flagellum is approximately 60 µm long, assuming that the sperm cell is observed at a lateral, rather than an axial, orientation.

Reconstruction of the 3D profile distribution of refractive index of an object from a set of digital holograms (a sequence OPD image frames) taken from multiple viewing angles of the object can be done using any of the known techniques. The diffraction algorithm can be implemented using either the Born or Rytov approximations, both of which take the incident field as the driving field at each point of the scatterer, and consider the scattered electrical field due to the presence of a sample. The Born approximation is valid when the scattered field is smaller than the incident field and specifically when the overall phase difference induced by the object is substantially smaller than $2\pi$ (23).

As the phase values of sperm cells often approach ~5 radians in a watery medium when tilted on their side, this condition is not met for all phase images. The Rytov approximation for the diffraction algorithm, on the other hand, is valid as long as the phase gradient in the sample is small as is generally the case for biological cells, and is thus a reasonable choice for applying tomography on sperm cells (14).

When applying the Rytov approximation for the Optical Digital Tomography (ODT) data processing, the Rytov field for each properly yaw-compensated and centered hologram, taken from viewpoint (θ,χ), is calculated as follows:

$$u_{Rytov}(x, y \mid \theta, \chi) = \log[|E_s(x, y \mid \theta, \chi)|/|E_0(x, y)|] + j\varphi(x, y \mid \theta, \chi)$$

where $|E_s(x,y|\theta,\chi)|$ is the amplitude extracted from the sample hologram taken from viewpoint (θ,χ); $|E_0(x,y)|$ is the amplitude extracted from a sample-free acquisition taken as a reference; $\varphi(x,y|\theta,\chi)|$ is the difference between the phase profile extracted from the sample hologram taken from viewpoint (θ,χ) and the phase profile extracted from a sample-free acquisition; and j is the imaginary unit. Each Rytov field profile taken from viewpoint (θ,χ) is then processed and mapped into a 2-D hemispheric surface (Ewald sphere) rotated in the same direction in the 3D spatial Fourier space.

This hemispheric surface is defined by the scattered wave vectors, which are given as follows for an incident untilted plane wave:

$$k_{s,x} = p\Delta k;$$
$$k_{s,y} = q\Delta k;$$
$$k_{s,z} = \sqrt{\left(\frac{2\pi n_m}{\lambda}\right)^2 - k_{s,x}^2 - k_{s,y}^2}$$

where p and q are the column and row indices defining the grid, respectively, $n_m$ is the refractive index of the surrounding medium, $\lambda$ is the illumination wavelength, and $\Delta k = 2\pi/L$ is the spectral pixel size, with L being the length of the field of view.

Then, pixels for which $k_{s,z} \leq 0$, are discarded, as they fit evanescent waves. The initial locations on the 3-D grid, forming an Ewald sphere, are given by:

$$k_x = p;$$
$$k_y = q;$$
$$k_z = \frac{1}{\Delta k}\left(k_{s,z} - \frac{2\pi n_m}{\lambda}\right)$$

The 2-D profile to be mapped on the Ewald sphere rotated to position $(\theta, \chi)$ is then calculated from the Rytov field profile taken at the same angle, according to:

$$U(k_x, k_y \mid \theta, \chi) = 2jk_{s,z} \odot FT_{2D}\{u_{Rytov}(x, y \mid \theta, \chi)\}$$

where $FT_{2D}$ is the 2D discrete Fourier transform, and $\odot$ is the Hadamard (element-wise) product. Here, too, pixels for which $k_{s,z} \leq 0$ are discarded. The three matrices $k_x$, $k_y$, and $k_z$ from the above equation for the initial locations on the 3-D grid, forming an Ewald sphere, are then reshaped to be vectors and stacked in three consecutive rows, forming the matrix $A_L$.

For each hologram recorded from viewpoint $(\theta, \chi)$, the 3-D location matrix $M_L(\theta, \chi)$, is then given by:

$$M_L(\theta, \chi) = \begin{bmatrix} \cos(\theta) & 0 & -\sin(\theta) \\ 0 & 1 & 1 \\ \sin(\theta) & 0 & \cos(\theta) \end{bmatrix} \cdot \begin{bmatrix} 1 & 0 & 0 \\ 0 & \cos(\chi) & -\sin(\chi) \\ 0 & \sin(\chi) & \cos(\chi) \end{bmatrix} \cdot A_L$$

where the position in the n-th dimension is given by the n-th row of the resultant matrix $M_L(\theta, \chi)$.

In the present example, where there is no constant rotation axis that can be defined as one of the Cartesian axes, the available sampling points in the 3D frequency domain are naturally unevenly distributed in the 3D Cartesian grid, causing substantial artifacts. This can be partially resolved by an additional interpolating step for estimating the unknown spectral values on a predefined 3D Cartesian grid. For this purpose, the inverse distance weighting interpolation method can be used, which is based on the assumption that the frequency sample that is to be interpolated should be more strongly influenced by closely located neighboring samples than by remotely located neighboring samples, such that the value at the desired location is a weighted linear average of the neighboring values, where the associated weight decreases with distance. This can be mathematically formulated as follows:

$$F_{cartesian} = \sum_{i=1}^{N} w_i \cdot f_i,$$
$$w_i = \frac{h_i^{-P}}{\sum_{k=1}^{N} h_k^{-P}}$$

where $f_i$ represents the spectral value of the i-th scattered frequency sample and $w_i$ is its associated weight, calculated based on the relative inverse distance h between the weighted sample and the interpolation site. N and P are, respectively, the number of neighbors considered and the weighting factor, where greater values of P assign greater influence to the values closest to the interpolated point. For example, $N \geq 30$ is chosen, implemented by looking for neighbors in a growing 3D cube until at least 30 neighbors are encountered, and P=4, according to a rule of thumb stating that for a D-dimensional problem, $P \leq D$ causes the interpolated values to be dominated by points far from the interpolation site.

Once all values on the 3-D grid are determined by interpolation, yielding the 3-D volume V, the 3D distribution of refractive index of the original object can be obtained by performing an inverse 3D Fourier transform and applying the following formula:

$$n(x, y, z) = \sqrt{n_m^2 - \frac{\lambda^2}{4\pi^2} \cdot f(x, y, z)}$$

where $n_m$ is the refractive index of the medium, $\lambda$ is the illumination wavelength, and f(x,y,z) is the result of the inverse 3D Fourier transform applied on the 3D volume V.

It should be noted that the quality of tomographic reconstruction improves with the available number of viewpoints. In the experiments conducted by the inventors 1000 projections were used.

As described above, for the refractive index reconstruction of the flagellum (i.e. calculation of the integral refractive index value of the flagellum), the flagellum pixels can be first classified into two groups: midpiece and non-midpiece. For this purpose, the length of the midpiece is evaluated at the detected seed point depth in each image frame. Based on the 4D segmentation of the flagellum (described above), the average pitch angle of the midpiece was determined in the experiment as being approximately 9°. Since the actual midpiece length is the length measured in the quantitative phase projection divided by the cosine of the pitch angle, the average error induced by not considering the pitch is 1% of the midpiece length. Therefore, the average midpiece length over all the image frames can be used to classify the pixels identified as flagellum pixels according to Euclidian distance from the seed point. It should be noted that a few dozen frames are enough to determine the length of the midpiece. To prevent bent tail positions from causing false association to the midpiece, once the first non-midpiece pixel is detected, all future pixels of that frame are declared non-midpiece as well. Then, the average of each group for the section width and maximal phase value parameters of the chosen depth, (estimated in the second part of the recursive function as described above) is calculated over all the image frames. Since the midpiece and non-midpiece portions of the flagellum can each be modeled as a cylinder (as described above), the thickness of the central pixel is equal to the width of the section. Thus, the integral of refractive index of each group can be calculated as follows:

$$n = n_m + \frac{\lambda \varphi_{max}}{2\pi \omega \Delta x}$$

where $n_m$ is the refractive index of the surrounding medium; $\lambda$ is the wavelength; $\Delta x$ is the length of each pixel, calculated as the ratio between the sensor pixel size and the total magnification; $\varphi_{max}$ is the average maximal phase value of the section for the group; and
w is the average section width in pixels for the group.

The full dynamic reconstruction of the entire sperm cell can be achieved by combining the 4D segmentation results for the flagellum with the 3D refractive index profile reconstruction of the head and 3D orientation of the head retrieved for each image frame. Voxels, attributed to the midpiece or the rest of the flagellum, are represented by disk of constant diameter, which is equal to the calculated average width of the respective area.

FIGS. 11A-11D present the full 4D reconstruction of a sperm cell results obtained in the experiments conducted by the inventors from 1000 OPD image frames. In these experiments, the image acquisition was recorded during free swim of the sperm cell in modified human tubal fluid (HTF) supplemented with 7% polyvinylpyrrolidone (PVP), which creates a viscous fluid commonly used in human ICSI to slow down sperm movement.

Figure 11A:
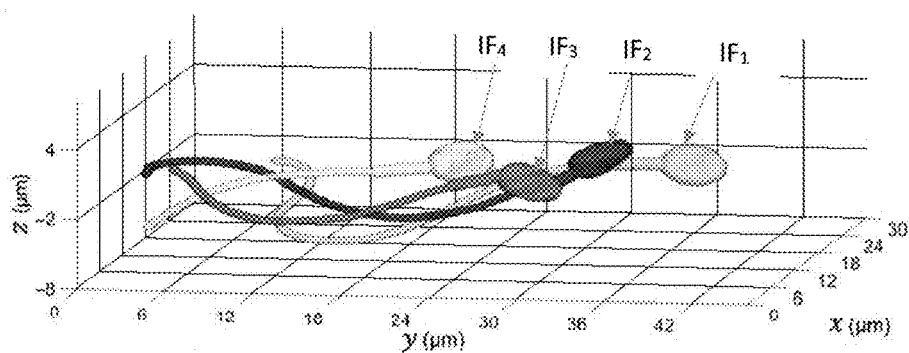
Figure 11B:
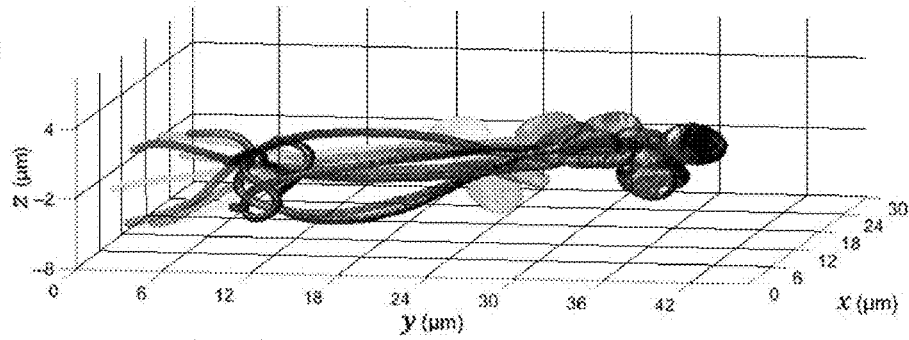
Figure 11C:
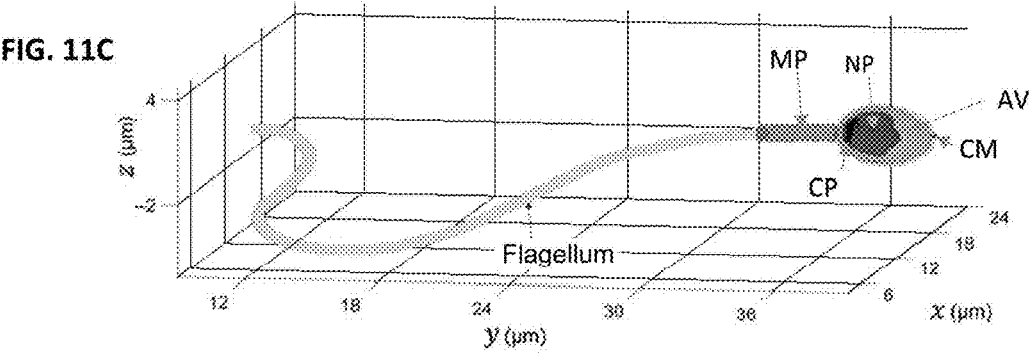
Figure 11D:
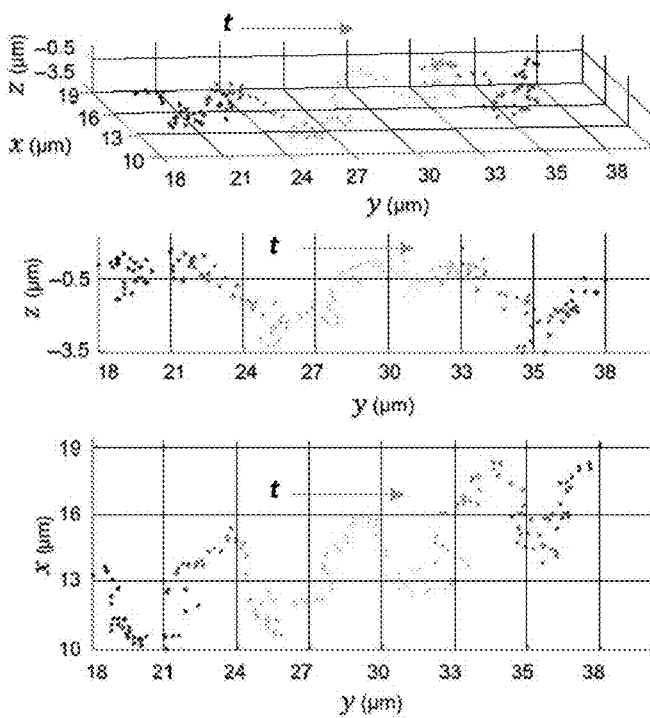

Here, FIG. 11A shows overlay of four consequent frames $IF_1$-$IF_4$, from the 3D motion of the sperm cell, each frame being assigned with a different color. FIG. 11B shows overlay of 15 frames from the 3D motion, each frame being assigned with a different opacity, where earlier times (frames) are more transparent. FIG. 11C shows a single frame from the 3D motion pattern, revealing the internal structure of the sperm cell (for the same cell shown in the above-described FIGS. 5A-5B and 9A-9C), with identifiable cell membrane CM ($1.355 \leq RI < 1.37$), RI being the refractive index, midpiece MP ($RI=1.383$), acrosomal vesicle AV ($1.37 \leq RI < 1.425$), nucleus NP ($1.425 \leq RI \leq 1.465$), and centriole region CR ($RI \geq 1.465$). The integral of refractive index was found to be 1.383 in the midpiece and 1.365 in the rest of the flagellum. FIG. 11D shows different views of the 3D trajectory of the sperm cell head centroid, as time t progresses. The path shown in this figure falls under the category of the "typical" trajectory (5)—the most prevalent swimming pattern observed among human sperm cells (>90% of cells)—where the sperm head moves forward swiftly along a slightly curved axis with a small arbitrary lateral displacement (approximately 4 μm side to side) in either direction orthogonal to the flow.

Thus, some embodiments of the presently disclosed subject matter provides a novel and effective technique for full reconstruction of the morphological data of a biological cell, using any known suitable holography-type equipment. The technique of some embodiments of the presently disclosed subject matter can advantageously provide the clinician with full 3D data of the sperm cells from a simple holographic video, including both 3D full structure and dynamics. The technique of some embodiments of the presently disclosed subject matter utilizes treating the head and the flagellum of the sperm cell as separate entities due to their physical dissimilarity, and applying different approaches for each of them.

The invention claimed is:

1. A reconstruction system for reconstructing morphology of biological cells, the system comprising data input and output utilities, memory, and a data processor, and being configured for data communication with an image data provider to receive from the image data provider raw image data comprising a sequence of image frames acquired from the cell during a movement of the cell and being indicative of optical path delay (OPD) of light propagation through the biological cell, wherein the data processor is configured and operable to process the raw image data and determine 3D dynamic morphological data of the cell, the data processor comprising:

a modeling utility configured and operable to provide a plurality of models descriptive for a number of selected portions of the cell;

a position recovery module configured and operable to perform, for each selected portion of the biological cell, model-based processing of the raw image data and determine segments of appearance of the selected portion of the biological cell in the image frames of at least a part of the sequence and determine position data of the selected portion of the biological cell in the image frames; and an analyzer module configured and operable to analyze the segments of image frames and the corresponding position data, and, for each of the selected portions of the biological cell, apply complex wavefront based processing to the segments of the image frames to generate reconstruction data indicative of a three-dimensional structure of the selected portion of the biological cell;

wherein the raw image data is indicative of autonomous swimming pattern of the biological cell, being a sperm cell, having a physical structure that causes the selected portion to rotate during movement while swimming, thereby enabling the appearance of different three-dimensional orientations of the cell during movement in the image frames, the selected portion of the sperm cell to be reconstructed including at least a head portion of the sperm cell, the determined segments of appearance of the selected portion comprising a single segment at which the selected portion appears in each of the image frames, and the position data comprising data indicative of three-dimensional orientation of the appearance of the selected portion in the segment of each image frame, the analyzer module being configured and operable to generate the reconstruction data comprising 3D refractive index profile of the head portion retrieved from a plurality of the image frames, and being characterized by at least one of the following:

(i) the analyzer module is configured and operable to generate the reconstruction data comprising the 3D profile of the refractive index of the head portion by performing, for each image frame, a three-dimensional Fourier transform of a wavefront corresponding to the single segment of the image frame at the determined 3D orientation; and (ii) the analyzer module is further configured and operable to analyze the reconstruction data of the head portion of the sperm cell to identify a region of a relatively high refractive index within a proximal part of the head portion where it interfaces with a midpiece part of the flagellum portion of the cell, and generate image data of a sperm centriole area.

2. A reconstruction system for reconstructing morphology of biological cells, the system comprising data input and output utilities, memory, and a data processor, and being configured for data communication with an image data provider to receive from the image data provider raw image data comprising a sequence of image frames acquired from the cell during a movement of the cell and being indicative of optical path delay (OPD) of light propagation through the biological cell, wherein the data processor is configured and operable to process the raw image data and determine 3D dynamic morphological data of the cell, the data processor comprising:

a modeling utility configured and operable to provide a plurality of models descriptive for a number of selected portions of the cell;

a position recovery module configured and operable to perform, for each selected portion of the biological cell, model-based processing of the raw image data and determine segments of appearance of the selected portion of the biological cell in the image frames of at least a part of the sequence and determine position data of the selected portion of the biological cell in the image frames; and an analyzer module configured and operable to analyze the segments of image frames and the corresponding position data, and, for each of the selected portions of the biological cell, apply complex wavefront based processing to the segments of the image frames to generate reconstruction data indicative of a three-dimensional structure of the selected portion of the biological cell;

wherein the position recovery module is configured and operable to apply a 2D fitting procedure to each image frame in the sequence of the image frames, and determine, per each image frame, parameters of a 2D fit between a 2D projection of the 3D primitive structure to appearance of the selected portion of the cell in the image frame, thereby determining 2D fitted projections, the parameters of the 2D fit between the 2D projection of the 3D primitive structure to appearance of the selected portion of the cell in the image frame comprising: 2D centroid [x,y] parameters of the fit of the 2D projection of the 3D primitive structure on the X-Y plane of the light field image frame, Gross-Yaw orientation $\alpha$ and, 2D sizes of a bounding box of the fitted 2D projection, the determined segments of appearance of the selected portion comprising a single segment at which the selected portion appears in each of the image frames, and the position data comprising data indicative of three-dimensional orientation of the appearance of the selected portion in the segment of each image frame.

3. A reconstruction system for reconstructing morphology of biological cells, the system comprising data input and output utilities, memory, and a data processor, and being configured for data communication with an image data provider to receive from the image data provider raw image data comprising a sequence of image frames acquired from the cell during a movement of the cell and being indicative of optical path delay (OPD) of light propagation through the biological cell, wherein the data processor is configured and operable to process the raw image data and determine 3D dynamic morphological data of the cell, the data processor comprising:

a modeling utility configured and operable to provide a plurality of models descriptive for a number of selected portions of the cell;

a position recovery module configured and operable to perform, for each selected portion of the biological cell, model-based processing of the raw image data and determine segments of appearance of the selected portion of the biological cell in the image frames of at least a part of the sequence and determine position data of the selected portion of the biological cell in the image frames; and an analyzer module configured and operable to analyze the segments of image frames and the corresponding position data, and, for each of the selected portions of the biological cell, apply complex wavefront based processing to the segments of the image frames to generate reconstruction data indicative of a three-dimensional structure of the selected portion of the biological cell;

wherein:

the raw image data is indicative of autonomous swimming pattern of the biological cell, being a sperm cell, having a physical structure that causes the selected portion to rotate during movement while swimming, thereby enabling the appearance of different three-dimensional orientations of the cell during movement in the image frames, the determined segments of appearance of the selected portion comprise a single segment at which the selected portion appears in each of the image frames, and the position data comprising data indicative of three-dimensional orientation of the appearance of the selected portion in the segment of each image frame, the selected portions of the sperm cell to be reconstructed include: a head portion of the sperm cell, the analyzer module being configured and operable to generate the reconstruction data comprising 3D refractive index profile of the head portion retrieved from a plurality of the image frames; and a flagellum portion of the sperm cell, the segments of appearance of the flagellum portion comprise a plurality of segments in each of the image frames associated with sub-portions of the flagellum portion, the model of the flagellum portion comprising a 3D primitive structure having a shape having axial symmetry about a roll axis, the position recovery module being configured and operable to apply the model-based processing to the flagellum portion by fitting a chain of the axially symmetric shape to the sub-portions of the flagellum portion, to determine the position data indicative of three-dimensional position and two-dimensional orientation of each sub-portion of the flagellum portion, thereby determining a three-dimensional shape of the flagellum portion in the image frame, the position recovery model is configured and operable to determine a z-axis location associated with a narrowest appearance of each sub-portion of the flagellum portion.

4. The system according to claim 1, wherein the model of the selected portion of the cell comprises a 3D primitive structure descriptive for a shape of the portion of the cell of the type to be reconstructed from the sequence.

5. The system according to claim 1, wherein the model of the selected portion further comprises a modelled motion pattern of the selected portion during the movement of the cell, the modelled motion pattern being indicative of rotational movement corresponding to varying viewing angles.

6. The system according to claim 2, wherein the raw image data is indicative of autonomous swimming pattern of the biological cell, being a living cell, having a physical structure that causes the selected portion to rotate during movement while swimming, thereby enabling the appearance of different three-dimensional orientations of the cell during movement in the image frames.

7. The system according to claim 6, wherein the living cell is a sperm cell, the selected portion of the sperm cell to be reconstructed include at least a head portion of the sperm cell, the analyzer module being configured and operable to generate the reconstruction data comprising 3D refractive index profile of the head portion retrieved from a plurality of the image frames.

8. The system according to claim 1, wherein the selected portion further includes a flagellum portion of the sperm cell, the segments of appearance of the flagellum portion comprise a plurality of segments in each of the image frames associated with sub-portions of the flagellum portion, the model of the flagellum portion comprising the 3D primitive structure having a shape having axial symmetry about a roll axis, the position recovery module being configured and operable to apply the model-based processing to the flagellum portion by fitting a chain of the axially symmetric shape to the sub-portions of the flagellum portion, to determine the position data indicative of three-dimensional position and two-dimensional orientation of each sub-portion of the flagellum portion, thereby determining a three-dimensional shape of the flagellum portion in the image frame.

9. The system according to claim 8, wherein the analyzer module is configured and operable to reconstruct dynamic data of the sperm cell based on four-dimensional motion pattern of the flagellum portion retrieved from a change in three-dimensional shape of the flagellum portion in a plurality of the image frames.

10. The system according to claim 9, wherein the analyzer module is configured and operable to analyze the image frames and generate reconstruction data comprising the 3D refractive index profile of the head portion and the dynamic data of the sperm cell based on the 4D motion pattern of the flagellum portion.

11. The system according to claim 1, wherein the 3D primitive structure descriptive for the selected portion of the cell is a structure having basic asymmetry with respect to three axes.

12. The system according to claim 11, wherein the 3D primitive structure descriptive for the selected portion of the cell has a non-spherically symmetric primitive shape with respect to three axes.

13. The system according to claim 11, wherein the 3D primitive structure of the selected portion, being a head portion of a sperm cell, has a characteristic relation between three different spatial dimensions [A,B,C] of the 3D primitive structure defining the basic asymmetry thereof, thereby enabling the determination of the three-dimensional orientation in each of the image frames.

14. The system according to claim 13, wherein the 3D primitive structure descriptive for the head portion of the cell is an ellipsoid, the different spatial dimensions [A,B,C] being major and minor radii of the ellipsoid (B>>A>C).

15. The system according to claim 13, wherein the position recovery module is configured and operable to utilize the different spatial dimensions of the modeled structure, to retrieve, from each image frame, all three angles of the head portion with respect to a reference 3D coordinate system.

16. The system according to claim 15, wherein the position recovery module is configured and operable to determine the three angles of the head portion for each image frame from a best fit condition between an image projection of the head portion in the image frame and a rotated position of the descriptive 3D primitive structure.

17. The system according to claim 1, wherein the position recovery module is configured and operable to apply a 2D fitting procedure to each image frame in the sequence of the image frames, and determine, per each image frame, parameters of a 2D fit between a 2D projection of the 3D primitive structure to appearance of the selected portion of the cell in the image frame, thereby determining 2D fitted projections.

18. The system according to claim 17, wherein the parameters of the 2D fit between the 2D projection of the 3D primitive structure to appearance of the selected portion of the cell in the image frame comprise: 2D centroid [x,y] parameters of the fit of the 2D projection of the 3D primitive structure on the X-Y plane of the light field image frame, Gross-Yaw orientation $\alpha$ and, 2D sizes of a bounding box of the fitted 2D projection.

19. The system according to claim 2, wherein the 2D fitting procedure comprises determining, for each respective image frame, a focal plane [z] corresponding to a best fit between the 2D projection of the 3D primitive structure and the appearance of the portion of the cell in the image frame, the focal plane z being a third centroid parameter of the 2D fit, thereby yielding 3D centroid [x,y,z] parameters of the fit of the 2D projection on the X-Y plane of the image frame.

20. The system according to claim 2, wherein the Gross-Yaw orientation $\alpha$ is determined within a range of [0,180] in each of the image frames, the data processor being configured and operable to provide a morphological model of at least one selected portion of a cell of the type similar to the biological cell appearing in the video, the morphological model characterizing an organelle located from one side of the selected portion of the cell.

21. The system according to claim 20, wherein the position recovery module is configured and operable to process image data of the image frame to identify a side of the organelle location relative to the at least portion of the cell and apply parity [+/−] correction to the Gross-Yaw orientation $\alpha$ of the light field image frame, thereby expanding the Gross-Yaw orientation $\alpha$ to the full [−180,+180] range.

22. The system according to claim 2, wherein the position recovery module is configured and operable to apply a 3D fitting procedure to the image frame and determine, per each image frame, parameters of a 3D fit between the 3D primitive structure and appearance of the selected portion of the cell in the image frame.

23. The system according to claim 22, wherein the 3D fitting procedure comprises using the fitted 2D projections in the image frames and the characteristic relation between three different spatial dimensions [A,B,C] of the 3D primitive structure to determine the parameters of the 3D fit comprising: 3D orientations [roll $\Theta$, pitch $\chi$, precise-yaw $\alpha+\alpha_0$] of fitted 3D primitive structure in each of the image frames.

24. The system according to claim 23, wherein the position recovery module is configured and operable to determine the at least one of the roll $\Theta$ and pitch $\chi$ within a range of [0,180] in each image frame, and utilizing a motion pattern model of the cell characterizing at least an expected continuous rotational movement of the cell during the sequence of image frames about an axis non perpendicular to an image plane to apply a parity [+/−] correction to the roll $\Theta$ and/or pitch x orientations of each successive image frame of the sequence according the roll $\Theta$ and/or pitch $\chi$ of the preceding image frame based on the continuous rotational movement, thereby expanding the roll $\Theta$ and/or the pitch $\chi$ parameters to the full [−180,+180] range.

25. The system according to claim 7, wherein the analyzer module is configured and operable to generate the reconstruction data comprising the 3D profile of the refractive index of the head portion by performing, for each image frame, a three-dimensional Fourier transform of a wavefront corresponding to the single segment of the image frame at the determined 3D orientation.

26. The system according to claim 7, wherein the analyzer module is further configured and operable to analyze the reconstruction data of the head portion of the sperm cell to identify a region of a relatively high refractive index within a proximal part of the head portion where it interfaces with a midpiece part of the flagellum portion of the cell, and generate image data of a sperm centriole area.

27. The system according to claim 8, wherein the position recovery model is configured and operable to determine a z-axis location associated with a narrowest appearance of each sub-portion of the flagellum portion.

28. The system according to claim 27, wherein the position recovery model is configured and operable to iteratively track the sub-portions of the flagellum portion from its proximal to distal end, and perform the model-based fitting of the chain of cylinders to the sub-portions of the flagellum portion and determine pixelized representation of the sub-portions of the flagellum portion in each image frame.

29. The system according to claim 28, wherein the position recovery module is configured and operable to perform the model-based processing separately with respect a midpiece part and a non-midpiece part of the flagellum portion using first and second modeled cylinder structures, respectively, the pixelized representation therefore comprising first and second groups of pixels corresponding to, respectively, the first and second parts of the flagellum portion of the cell.

30. The system according to claim 29, wherein the analyzer module is configured and operable to analyze the pixelized representation and determine a global average, over all the image frames, of a maximal phase value and a width of the sub-portion for each of the first and second groups, the width of the sub-portion being determined as a thickness of a central pixel of the sub-portion.

31. An imaging system comprising: an imaging unit configured and operable to perform imaging session on a biological cell during a movement of the biological cell and generate raw image data comprising a sequence of image frames indicative of optical path delay (OPD) of light propagation through the biological cell; and the reconstruction system of claim 30 configured for data communication with the imaging unit to receive and process the raw image data and generate reconstructed data indicative of morphology and dynamics of the biological cell.

* * * * *